US012058660B2

(12) United States Patent
Lee et al.

(10) Patent No.: US 12,058,660 B2
(45) Date of Patent: *Aug. 6, 2024

(54) METHOD FOR TRANSMITTING/RECEIVING SIGNAL BASED ON REDUCED CAPABILITY IN WIRELESS COMMUNICATION SYSTEM, AND DEVICE THEREFOR

(71) Applicant: LG ELECTRONICS INC., Seoul (KR)

(72) Inventors: Youngdae Lee, Seoul (KR); Jaehyung Kim, Seoul (KR); Suckchel Yang, Seoul (KR); Seonwook Kim, Seoul (KR); Seunggye Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/376,991

(22) Filed: Oct. 5, 2023

(65) Prior Publication Data
US 2024/0064721 A1 Feb. 22, 2024

Related U.S. Application Data

(63) Continuation of application No. 17/951,033, filed on Sep. 22, 2022, now Pat. No. 11,818,699, which is a (Continued)

(30) Foreign Application Priority Data

May 15, 2020 (KR) ........................ 10-2020-0058639

(51) Int. Cl.
H04L 12/28 (2006.01)
H04L 5/00 (2006.01)
(Continued)

(52) U.S. Cl.
CPC ....... H04W 72/0453 (2013.01); H04L 5/0053 (2013.01)

(58) Field of Classification Search
CPC ............... H04L 5/0053; H04L 1/1854; H04W 72/0453; H04W 72/51; H04W 48/10; H04W 56/001; H04W 74/0833
(Continued)

(56) References Cited

U.S. PATENT DOCUMENTS 11,445,491 B2 * 9/2022 Liu ........................ H04L 5/0053
2011/0047230 A1 * 2/2011 McGee ................... H04L 69/40
709/217
(Continued)

Primary Examiner — John Pezzlo
(74) Attorney, Agent, or Firm — LEE, HONG, DEGERMAN, KANG & WAIMEY

(57) ABSTRACT

A terminal having reduced capability so as to support a bandwidth smaller than a specific bandwidth, according to one embodiment of the present invention, can detect a physical broadcast channel (PBCH) signal through a synchronization signal block (SSB) on a first downlink (DL) bandwidth part (BWP), obtain a part of system information including a master information block (MIB) carried by the PBCH signal from among pieces of first system information provided on the first DL BWP, and obtain second system information provided on a second DL BWP that is different from the first DL BWP.

12 Claims, 17 Drawing Sheets

Related U.S. Application Data continuation of application No. PCT/KR2021/006139, filed on May 17, 2021.

(51) Int. Cl.
*H04W 72/0453* (2023.01)
*H04J 1/16* (2006.01)

(58) Field of Classification Search
USPC .................................. 370/252, 329, 430, 503
See application file for complete search history.

(56) References Cited

U.S. PATENT DOCUMENTS

2020/0137741 A1* 4/2020 Zhou ..................... H04B 7/0695
2023/0209542 A1* 6/2023 Wang ................ H04W 74/0833
370/329

* cited by examiner (a)

METHOD FOR TRANSMITTING/RECEIVING SIGNAL BASED ON REDUCED CAPABILITY IN WIRELESS COMMUNICATION SYSTEM, AND DEVICE THEREFOR

CROSS-REFERENCE TO RELATED APPLICATIONS

This application is a continuation of U.S. patent application Ser. No. 17/951,033, filed on Sep. 22, 2022, which is a continuation of International Application No. PCT/KR2021/006139, filed on May 17, 2021, which claims the benefit of earlier filing date and right of priority to Korean Patent Application No. 10-2020-0058639, filed on May 15, 2020, the contents of all of which are hereby incorporated by reference herein in their entireties.

TECHNICAL FIELD

The present disclosure relates to wireless communication, and more particularly, to a method of transmitting or receiving an uplink/downlink signal in a wireless communication system and apparatus therefor.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

The object of the present disclosure is to provide a method of transmitting and receiving signals more efficiently in a wireless communication system where different types of user equipments (UEs) operate.

The objects of present disclosure are not limited to what has been particularly described hereinabove, and other objects that the present disclosure could achieve will be more clearly understood from the following detailed description.

Technical Solution

In an aspect of the present disclosure, there is provided a method of receiving a signal by a user equipment (UE) in a 3rd generation partnership project (3GPP) based wireless communication system. The method may include: detecting a physical broadcast channel (PBCH) signal in a synchronization signal block (SSB) on a first downlink (DL) bandwidth part (BWP); obtaining partial system information including a master information block (MIB) carried by the PBCH signal from among first system information provided on the first DL BWP; and obtaining second system information provided on a second DL BWP different from the first DL BWP. Based on that the UE is a second type of UE with reduced capability to support a smaller bandwidth than a first type of UE, the UE may be configured to: perform BWP switching from the first DL BWP to the second DL BWP; and obtain the second system information provided on the second DL BWP as remaining parts except for the partial system information obtained on the first DL BWP.

The UE may be configured to perform cell access based on a plurality of initial DL BWPs.

The first DL BWP and the second DL BWP may be a first initial DL BWP and a second initial DL BWP, respectively.

The first DL BWP may be related to a bandwidth of the first type of UE, and the second DL BWP may be related to a bandwidth of the second type of UE.

The PBCH signal on the first DL BWP may be a common signal for the first type of UE and the second type of UE.

The second system information may be information for the second type of UE other than the first type of UE. The second system information may include at least one second-type system information block (SIB) for the second type of UE.

Obtaining, by the UE, the partial system information on the first DL BWP may include: obtaining a first control resource set (CORESET) configuration and a first common search space (CSS) configuration from the MIB, wherein the first CORESET configuration and the first CSS configuration may be related to control information scheduling first-type system information block 1 (SIB1) for the first type of UE; and obtaining the first-type SIB1 based on the first CORESET configuration and the first CSS configuration, and Obtaining, by the UE, the second system information on the second DL BWP may include obtaining at least one second-type SIB provided on the second DL BWP based on the first-type SIB1.

Obtaining, by the UE, the partial system information on the first DL BWP may include obtaining a first CORESET configuration and a first CSS configuration from the MIB, wherein the first CORESET configuration and the first CSS configuration may be related to control information scheduling first-type SIB1 for the first type of UE.

Obtaining, by the UE, the second system information on the second DL BWP may include: obtaining at least one of a second CORESET configuration or a second CSS configuration on the second DL BWP by applying a time/frequency offset to at least one of the first CORESET configuration or the first CSS configuration; and obtaining at least one second-type SIB provided on the second DL BWP based on the at least one of the second CORESET configuration or the second CSS configuration.

In another aspect of the present disclosure, there is provided a processor-readable storage medium having stored thereon a program for executing the above-described method.

In another aspect of the present disclosure, there is provided a device for 3GPP based wireless communication. The device may include: a memory configured to store instructions; and a processor configured to perform operations by executing the instructions. The operations performed by the processor may include: detecting a PBCH signal in an SSB on a first DL BWP; obtaining partial system information including an MIB carried by the PBCH signal from among first system information provided on the first DL BWP; and obtaining second system information provided on a second DL BWP different from the first DL BWP. Based on that the device is a second type of device with reduced capability to support a smaller bandwidth than a first type of device, the processor may be configured to: perform BWP switching from the first DL BWP to the second DL BWP; and obtain the second system information provided on the second DL BWP as remaining parts except for the partial system information obtained on the first DL BWP.

The device may further include a transceiver configured to transmit and receive a radio signal under control of the processor.

The device may be a UE for the 3GPP based wireless communication.

The device may be an application-specific integrated circuit (ASIC) or a digital signal processing device.

In another aspect of the present disclosure, there is provided a method of transmitting a signal by a base station in a 3GPP based wireless communication system. The method may include: transmitting a PBCH signal in an SSB on a first DL BWP; and transmitting second system information on a second DL BWP different from the first DL BWP. The base station may be configured to: support both a first type of UE and a second type of UE with reduced capability to support a smaller bandwidth than the first type of UE; provide partial system information including an MIB carried by the PBCH signal to the second type of UE by transmitting first system information on the first DL BWP; and provide remaining system information to the second type of UE by transmitting the second system information on the second DL BWP.

In a further aspect of the present disclosure, there is provided a base station configured to transmit a signal in a 3GPP based wireless communication system. The base station may include: a memory configured to store instructions; and a processor configured to perform operations by executing the instructions. The operations performed by the processor may include: transmitting a PBCH signal in an SSB on a first DL BWP; and transmitting second system information on a second DL BWP different from the first DL BWP. The processor may be configured to: support both a first type of UE and a second type of UE with reduced capability to support a smaller bandwidth than the first type of UE; provide partial system information including an MIB carried by the PBCH signal to the second type of UE by transmitting first system information on the first DL BWP; and provide remaining system information to the second type of UE by transmitting the second system information on the second DL BWP.

Advantageous Effects

According to an embodiment of the present disclosure, a user equipment (UE) with reduced bandwidth capability may perform initial downlink (DL) bandwidth part (BWP) operation and system information acquisition more efficiently.

The effects of present disclosure are not limited to what has been particularly described hereinabove, and other effects that the present disclosure could achieve will be more clearly understood from the following detailed description.

BEST MODE

Figure 1:
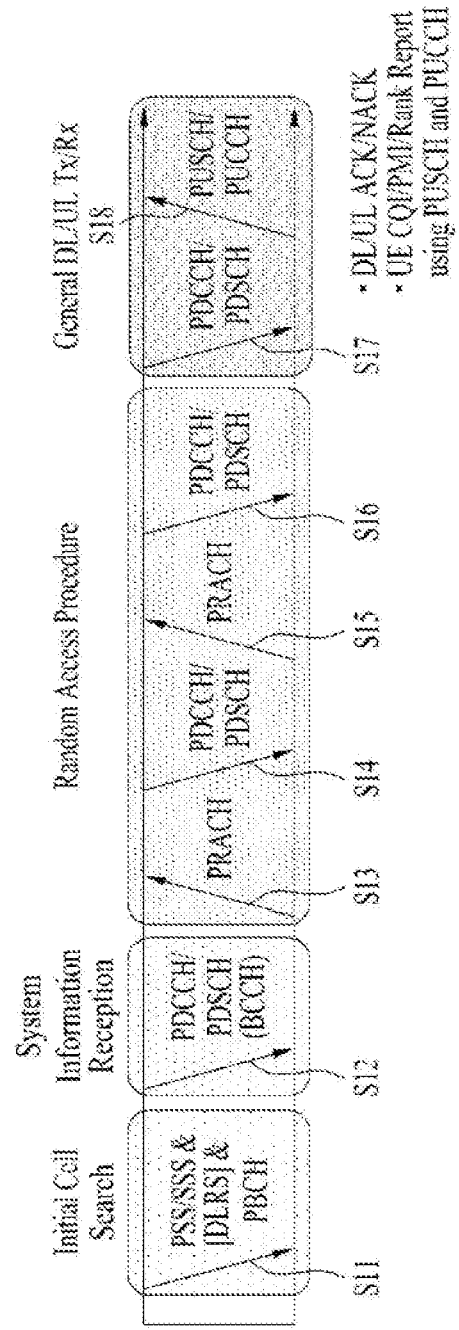
FIG. 1 illustrates physical channels used in a 3rd generation partnership project (3GPP) system as an exemplary wireless communication system, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto. LTE refers to technologies after 3GPP TS 36.xxx Release 8. Specifically, LTE technologies after 3GPP TS 36.xxx Release 10 are referred to as LTE-A, and LTE technologies after 3GPP TS 36.xxx Release 13 are referred to as LTE-A pro. 3GPP NR refers to technologies after TS 38.xxx Release 15. LTE/NR may be referred to as 3GPP systems. In this document, "xxx" represents the detail number of a specification. LTE/NR may be collectively referred to as 3GPP systems.

Details of the background, terminology, abbreviations, etc. used herein may be found in documents published before the present disclosure. For example, the present disclosure may be supported by the following documents:

3GPP LTE
- 36.211: Physical channels and modulation
- 36.212: Multiplexing and channel coding
- 36.213: Physical layer procedures
- 36.300: Overall description
- 36.321: Medium Access Control (MAC)
- 36.331: Radio Resource Control (RRC)

3GPP NR
- 38.211: Physical channels and modulation
- 38.212: Multiplexing and channel coding
- 38.213: Physical layer procedures for control
- 38.214: Physical layer procedures for data
- 38.300: NR and NG-RAN Overall Description
- 38.321: Medium Access Control (MAC)
- 38.331: Radio Resource Control (RRC) protocol specification Technical Terms Used in this Document
- PDCCH: Physical Downlink Control CHannel
- PDSCH: Physical Downlink Shared CHannel
- PUSCH: Physical Uplink Shared CHannel
- CSI: Channel state information
- RRM: Radio resource management
- RLM: Radio link monitoring
- DCI: Downlink Control Information
- CAP: Channel Access Procedure
- Ucell: Unlicensed cell
- PCell: Primary Cell
- PSCell: Primary SCG Cell
- TBS: Transport Block Size
- SLIV: Starting and Length Indicator Value (The SLIV is a field that indicates the starting symbol index and the number of symbols in a slot for a PDSCH and/or PUSCH, and the SLIV is carried on a PDCCH scheduling the corresponding PDSCH and/or PUSCH.)
- BWP: BandWidth Part (The BWP may be composed of consecutive resource blocks (RBs) in the frequency domain, which may correspond to one numerology (e.g., subcarrier spacing, cyclic prefix (CP) length, slot/mini-slot duration, etc.). In addition, multiple BWPs may be configured on one carrier (the number of BWPs per carrier may be limited), but the number of active BWPs may be limited in each carrier (e.g., one).)
- CORESET: COntrol REsourse SET (The CORESET refers to a time frequency resource region capable of transmitting a PDCCH, and the number of CORESETs per BWP may be limited.)
- REG: Resource element group
- SFI: Slot Format Indicator (The SFI is an indicator that indicates the DL/UL direction at the symbol level in specific slot(s), and the SFI is transmitted over a group-common PDCCH.)
- COT: Channel occupancy time
- SPS: Semi-persistent scheduling
- PLMN ID: Public Land Mobile Network identifier
- RACH: Random Access Channel
- RAR: Random Access Response
- Msg3: Message transmitted on UL-SCH containing a C-RNTI MAC CE or CCCH SDU, submitted from upper layer and associated with the UE Contention Resolution Identity, as part of a Random Access procedure.
- Special Cell: For Dual Connectivity operation the term Special Cell refers to the PCell of the MCG or the PSCell of the SCG depending on if the MAC entity is associated to the MCG or the SCG, respectively. Otherwise the term Special Cell refers to the PCell. A Special Cell supports PUCCH transmission and contention-based Random Access, and is always activated.
- Serving Cell: A PCell, a PSCell, or an SCell In the present disclosure, the term "set/setting" may be replaced with "configure/configuration", and both may be used interchangeably. Further, a conditional expression (e.g., "if", "in a case", or "when") may be replaced by "based on that" or "in a state/status". In addition, an operation or software/hardware (SW/HW) configuration of a user equipment (UE)/base station (BS) may be derived/understood based on satisfaction of a corresponding condition. When a process on a receiving (or transmitting) side may be derived/understood from a process on the transmitting (or receiving) side in signal transmission/reception between wireless communication devices (e.g., a BS and a UE), its description may be omitted. Signal determination/generation/encoding/transmission of the transmitting side, for example, may be understood as signal monitoring reception/decoding/determination of the receiving side. Further, when it is said that a UE performs (or does not perform) a specific operation, this may also be interpreted as that a BS expects/assumes (or does not expect/assume) that the UE performs the specific operation. When it is said that a BS performs (or does not perform) a specific operation, this may also be interpreted as that a UE expects/assumes (or does not expect/assume) that the BS performs the specific operation. In the following description, sections, embodiments, examples, options, methods, schemes, proposals and so on are distinguished from each other and indexed, for convenience of description, which does not mean that each of them necessarily constitutes an independent disclosure or that each of them should be implemented only individually. Unless explicitly contradicting each other, it may be derived/understood that at least some of the sections, embodiments, examples, options, methods, schemes, proposals and so on may be implemented in combination or may be omitted.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

The SSB is composed of four consecutive OFDM symbols, each carrying the PSS, the PBCH, the SSS/PBCH, or the PBCH. Each of the PSS and the SSS includes one OFDM symbol by 127 subcarriers, and the PBCH includes three OFDM symbols by 576 subcarriers. The PBCH is encoded/decoded based on Polar codes, and modulation/demodulation is performed thereon according to quadrature phase shift keying (QPSK). The PBCH in the OFDM symbol consists of data resource elements (REs) to which a complex modulation value of the PBCH is mapped, and demodulation reference signal (DMRS) REs to which a DMRS for the PBCH is mapped. Three DMRS REs are configured for each RB in the OFDM symbol, and three data REs configured between DMRS REs.

The PSS may be used in detecting a cell ID within a cell ID group, and the SSS may be used in detecting a cell ID group. The PBCH may be used in detecting an SSB (time) index and a half-frame. There are 336 cell ID groups, and each cell ID group includes three cell IDs. Thus, there are a total of 1008 cell IDs.

SSBs are periodically transmitted with an SSB periodicity. A default SSB periodicity assumed by the UE in initial cell search is defined as 20 ms. After cell access, the SSB periodicity may be set to one of {5 ms, 10 ms, 20 ms, 40 ms, 80 ms, and 160 ms} by the network (e.g., BS). An SSB burst set may be configured at the beginning of the SSB periodicity. The SSB burst set may be set to a time window of 5 ms (i.e., half-frame), and the SSB may be repeatedly transmitted up to L times within the SS burst set. The maximum number of SSB transmissions L may be given depending carrier frequency bands as follows. One slot includes up to two SSBs.

For frequency range up to 3 GHz, L=4
For frequency range from 3 GHz to 6 GHz, L=8
For frequency range from 6 GHz to 52.6 GHz, L=64

The time-domain positions of candidate SSBs in the SS burst set may be defined depending on subcarrier spacings. The time-domain positions of the candidate SSBs are indexed from (SSB indices) 0 to L−1 in temporal order within the SSB burst set (i.e., half-frame).

Multiple SSBs may be transmitted within the frequency span of a carrier. Each SSB may not need to have a unique physical layer cell identifier, but different SSBs may have different physical layer cell identifiers.

The UE may acquire DL synchronization by detecting the SSB. The UE may identify the structure of the SSB burst set based on the detected SSB (time) index, and thus the UE may detect a symbol/slot/half-frame boundary. A frame/half-frame number to which the detected SSB belongs may be identified based on system frame number (SFN) information and half-frame indication information.

Specifically, the UE may obtain a 10-bit SFN for a frame to which a PBCH belongs from the PBCH. Then, the UE may obtain 1-bit half-frame indication information. For example, when the UE detects the PBCH in which the half-frame indication bit is set to 0, the UE may determine that an SSB to which the PBCH belongs is included in the first half-frame of the frame. When the UE detects the PBCH in which the half-frame indication bit is set to 1, the UE may determine that an SSB to which the PBCH belongs is included in the second half-frame of the frame. Finally, the UE may obtain the SSB index of the SSB to which the PBCH belongs based on a DMRS sequence and a PBCH payload carried by the PBCH.

After initial cell search, the UE may acquire more specific system information by receiving a physical downlink control channel (PDCCH) and receiving a physical downlink shared channel (PDSCH) based on information of the PDCCH in step S102.

System information (SI) is divided into a master information block (MIB) and a plurality of system information blocks (SIBs). The SI except for the MIB may be referred to as remaining minimum system information (RMSI). Details thereof will be described in the following.

The MIB includes information/parameters for monitoring a PDCCH scheduling a PDSCH carrying SIB1 (SystemInformationBlock1), and the MIB is transmitted by the BS over the PBCH of an SSB. For example, the UE may check based on the MIB whether there is a CORESET for a Type0-PDCCH common search space. The Type0-PDCCH common search space is a kind of PDCCH search space, which is used to transmit a PDCCH scheduling an SI message. If the Type0-PDCCH common search space exists, the UE may determine (1) a plurality of contiguous RBs and one or more consecutive symbols included in the CORESET and (ii) a PDCCH occasion (e.g., a time-domain location for PDCCH reception, based on information (e.g., pdcch-ConfigSIB1) in the MIB. If the Type0-PDCCH common search space does not exist, pdcch-ConfigSIB1 provides information on a frequency location at which the SSB/SIB1 exists and information on a frequency range where there are no SSB/SIB1.

SIB1 includes information related to availability and scheduling (e.g., transmission periodicity, SI-window size, etc.) of the remaining SIBs (hereinafter referred to as SIBx where x is an integer more than or equal to 2). For example, SIB1 may indicate whether SIBx is periodically broadcast or provided at the request of the UE in an on-demand manner. When SIBx is provided in an on-demand manner, SIB1 may include information necessary for the UE to send an SI request. SIB1 is transmitted over a PDSCH, and a PDCCH scheduling SIB1 is transmitted in the Type0-PDCCH common search space. That is, SIB1 is transmitted over the PDSCH indicated by the PDCCH.

SIBx is included in the SI message and transmitted on the PDSCH. Each SI message is transmitted within a periodically occurring time window (i.e., SI-window).

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
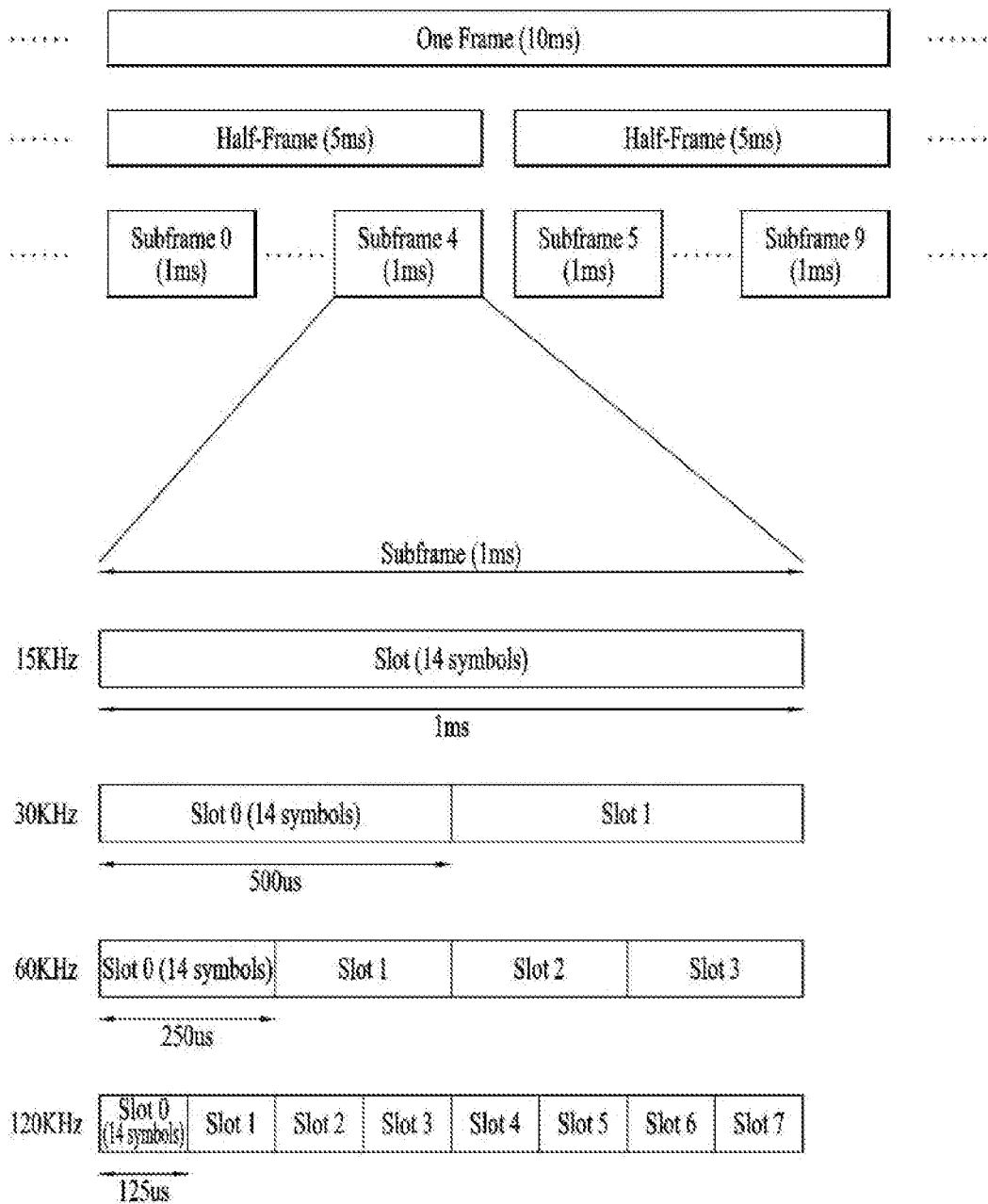
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

$N^{slot}_{symb}$: Number of symbols in a slot
$N^{frame, u}_{slot}$: Number of slots in a frame
$N^{subframe, u}_{slot}$: Number of slots in a subframe Table 2 illustrates that the number of symbols per slot, the number of slots per frame, and the number of slots per subframe vary according to the SCS when the extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
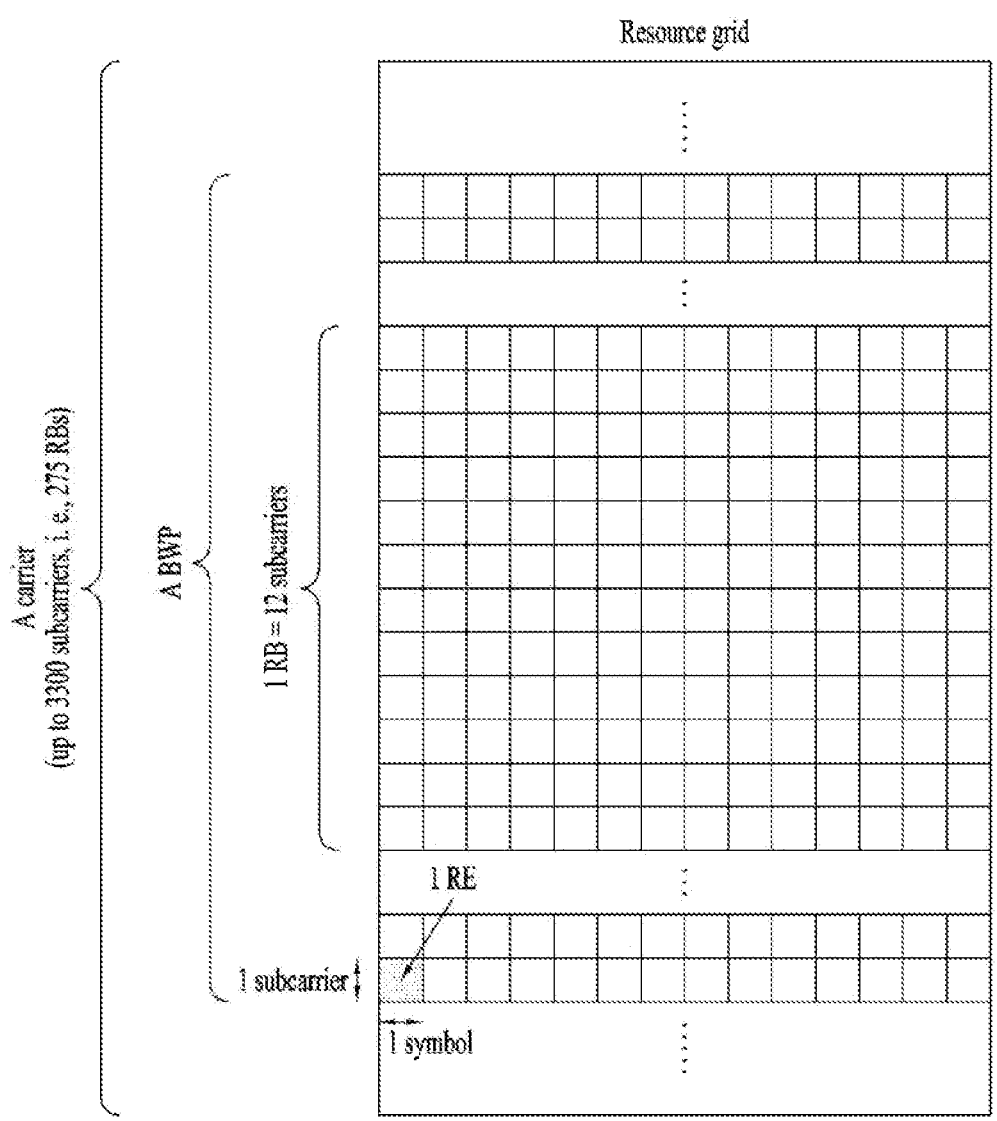
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Bandwidth Part (BWP)

The NR system may support up to 400 MHz for each carrier. The network may instruct the UE to operate only in a partial bandwidth rather than the whole bandwidth of such a wideband carrier. The partial bandwidth is referred to as a BWP. The BWP refers to a subset of contiguous common RBs defined for a numerology in the BWP of a carrier in the frequency domain, and one numerology (e.g., SCS, CP length, slot/mini-slot duration, etc.) may be configured.

Activation/deactivation of a DL/UL BWP or BWP switching may be performed according to network signaling and/or timers (e.g., L1 signaling corresponding to a physical layer control signal, a MAC control element corresponding to a MAC layer control signal, RRC signaling, etc.). While performing initial access or before setting up an RRC connection, the UE may not receive any DL/UL BWP configurations. A DL/UL BWP that the UE assumes in this situation is referred to as an initial active DL/UL BWP.

Regarding to the initial DL BWP, the following UE operations are defined in 3GPP NR specifications.

For a DL BWP, if a UE is not provided searchSpaceSIB1 for Type0-PDCCH CSS set by PDCCH-ConfigCommon, the UE does not monitor PDCCH candidates for a Type0-PDCCH CSS set on the DL BWP. The Type0-PDCCH CSS set is defined by the CCE aggregation levels and the number of PDCCH candidates per CCE aggregation level. If the active DL BWP and the initial DL BWP have same SCS and same CP length and the active DL BWP includes all RBs of the CORESET with index 0, or the active DL BWP is the initial DL BWP, the CORESET configured for Type0-PDCCH CSS set has CORESET index 0 and the Type0-PDCCH CSS set has search space set index 0.

A UE configured for operation in bandwidth parts (BWPs) of a serving cell, is configured by higher layers for the serving cell a set of at most four bandwidth parts (BWPs) for receptions by the UE (DL BWP set) in a DL bandwidth by parameter BWP-Downlink or by parameter initialDownlinkBWP with a set of parameters configured by BWP-DownlinkCommon and BWP-DownlinkDedicated, and a set of at most four BWPs for transmissions by the UE (UL BWP set) in an UL bandwidth by parameter BWP-Uplink or by parameter initialUplinkBWP with a set of parameters configured by BWP-UplinkCommon and BWP-UplinkDedicated.

If a UE is not provided initialDownlinkBWP, an initial DL BWP is defined by a location and number of contiguous PRBs, starting from a PRB with the lowest index and ending at a PRB with the highest index among PRBs of a CORESET for Type0-PDCCH CSS set, and a SCS and a cyclic prefix for PDCCH reception in the CORESET for Type0-PDCCH CSS set; otherwise, the initial DL BWP is provided by initialDownlinkBWP. For operation on the primary cell or on a secondary cell, a UE is provided an initial UL BWP by initialUplinkBWP. If the UE is configured with a supplementary UL carrier, the UE can be provided an initial UL BWP on the supplementary UL carrier by initialUplinkBWP.

If a UE is provided controlResourceSetZero and searchSpaceZero in PDCCH-ConfigSIB1 or PDCCH-ConfigCommon, the UE determines a CORESET for a search space set from controlResourcesetZero, and determines corresponding PDCCH monitoring occasions. If the active DL BWP is not the initial DL BWP, the UE determines PDCCH monitoring occasions for the search space set only if the CORESET bandwidth is within the active DL BWP and the active DL BWP has same SCS configuration and same cyclic prefix as the initial DL BWP.

For a serving cell, a UE can be provided by defaultDownlinkBWP-Id a default DL BWP among the configured DL BWPs. If a UE is not provided a default DL BWP by defaultDownlinkBWP-Id, the default DL BWP is the initial DL BWP.

Figure 4:
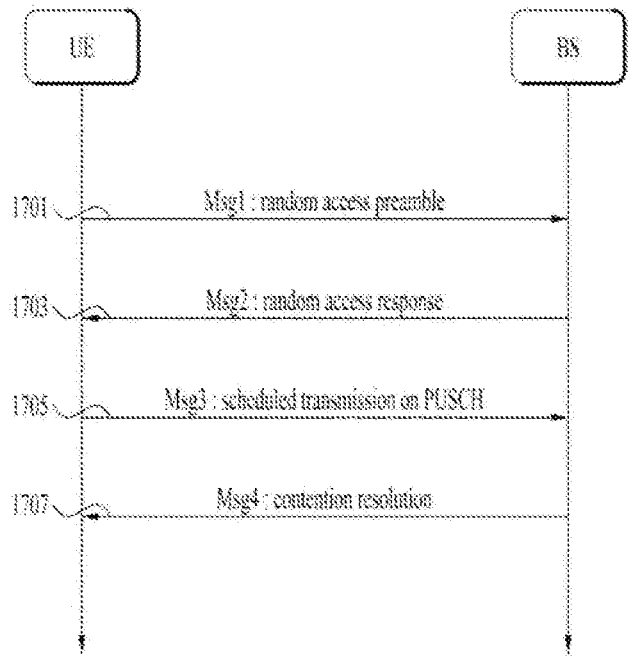
FIG. 4 illustrates a random access procedure.
Figure 4:
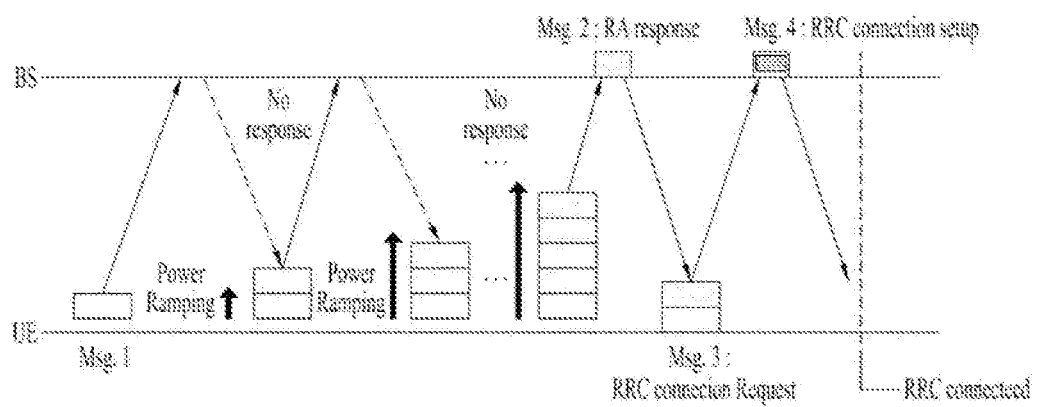

FIG. 4 illustrates an exemplary normal random access procedure. Specifically, FIG. 4 shows a contention-based random access procedure of the UE, which is performed in four steps.

First, the UE may transmit message 1 (Msg1) including a random access preamble on a PRACH (see 1701 of FIG. 4(*a*)).

Random access preamble sequences with different lengths may be supported. A long sequence length of 839 may be applied to SCSs of 1.25 and 5 kHz, and a short sequence length of 139 may be applied to SCSs of 15, 30, 60, and 120 kHz.

Multiple preamble formats may be defined by one or more RACH OFDM symbols and different CPs (and/or guard times). A RACH configuration for a cell may be included in SI about the cell and provided to the UE. The RACH configuration may include information on the SCS of the PRACH, available preambles, preamble formats, and so on. The RACH configuration may include information about association between SSBs and RACH (time-frequency) resources. The UE transmits a random access preamble on a RACH time-frequency resource associated with a detected or selected SSB.

The threshold of an SSB for RACH resource association may be configured by the network, and a RACH preamble may be transmitted or retransmitted based on an SSB where reference signal received power (RSRP), which is measured based on the SSB, satisfies the threshold. For example, the UE may select one SSB from among SSBs that satisfy the threshold and transmit or retransmit the RACH preamble based on a RACH resource associated with the selected SSB.

Upon receiving the random access preamble from the UE, the BS may transmit message 2 (Msg2) corresponding to a random access response (RAR) message to the UE (see 1703 of FIG. 4(*a*)). A PDCCH scheduling a PDSCH carrying the RAR may be CRC masked with a random access (RA) radio network temporary identifier (RNTI) (RA-RNTI) and then transmitted. Upon detecting the PDCCH masked by the RA-RNTI, the UE may obtain the RAR from the PDSCH scheduled by DCI carried by the PDCCH. The UE may check whether the RAR includes RAR information in response to the preamble transmitted by the UE, i.e., Msg1. The presence or absence of the RAR information in response to Msg1 transmitted by the UE may be determined depending on whether there is a random access preamble ID for the preamble transmitted by the UE. If there is no response to Msg1, the UE may retransmit the RACH preamble within a predetermined number of times while performing power ramping. The UE may calculate PRACH transmit power for retransmitting the preamble based on the most recent path loss and power ramping counter.

The RAR information transmitted on the PDSCH may include timing advance (TA) information for UL synchronization, an initial UL grant, and a temporary cell-RNTI (C-RNTI). The TA information may be used to control a UL signal transmission timing. The UE may transmit a UL signal over a UL shared channel as message 3 (Msg3) of the random access procedure based on the RAR information (see 1705 of FIG. 4(*a*)). Msg3 may include an RRC connection request and a UE identifier. In response to Msg3, the network may transmit message 4 (Msg4), which may be treated as a contention resolution message on DL (see 1707 of FIG. 4(*a*)). Upon receiving Msg4, the UE may enter the RRC_CONNECTED state.

On the other hand, a contention-free random access procedure may be performed when the UE is handed over to another cell or BS or when it is requested by the BS. In the contention-free random access procedure, a preamble to be used by the UE (hereinafter referred to as a dedicated random access preamble) is allocated by the BS. Information on the dedicated random access preamble may be included in an RRC message (e.g., handover command) or provided to the UE through a PDCCH order. When the random access procedure is initiated, the UE may transmit the dedicated random access preamble to the BS. When the UE receives an RAR from the BS, the random access procedure is completed.

As described above, a UL grant in the RAR may schedule PUSCH transmission to the UE. A PUSCH carrying initial UL transmission based on the UL grant in the RAR is referred to as an Msg3 PUSCH. The content of an RAR UL grant may start at the MSB and end at the LSB, and the content may be given as shown in Table 3.

TABLE 3

| RAR UL grant field | Number of bits |
|---|---|
| Frequency hopping flag | 1 |
| Msg3 PUSCH frequency resource allocation | 12 |
| Msg3 PUSCH time resource allocation | 4 |
| Modulation and coding scheme (MCS) | 4 |
| Transmit power control (TPC) for Msg3 PUSCH | 3 |
| CSI request | 1 |

Figure 5:
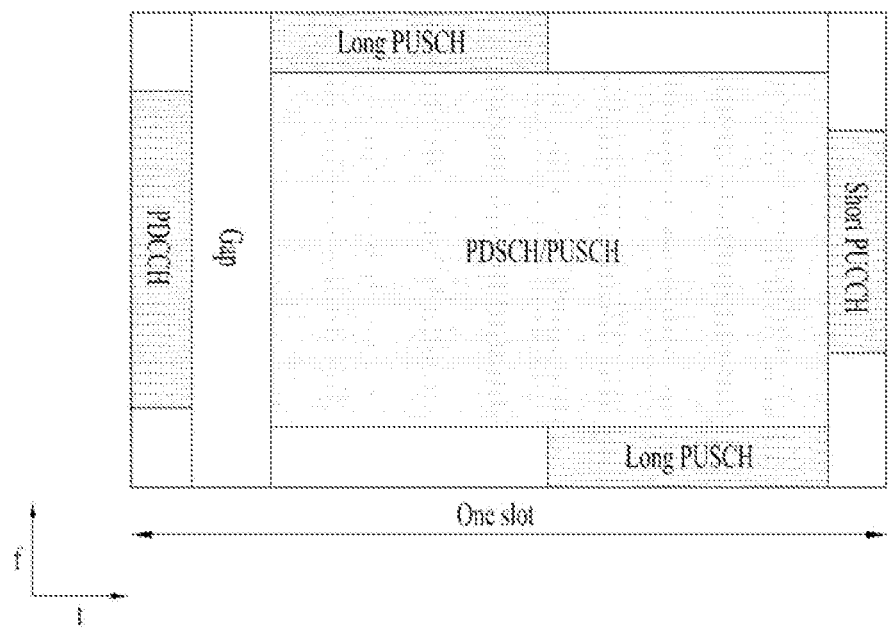
FIG. 5 illustrates an example of physical channel mapping.
Figure 6:
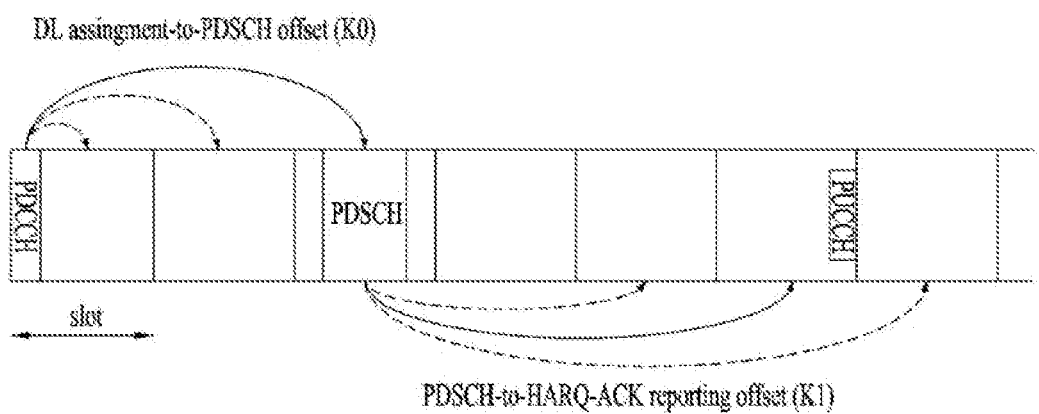
FIG. 6 illustrates an exemplary acknowledgment/negative acknowledgment (ACK/NACK) transmission process.
Figure 7:
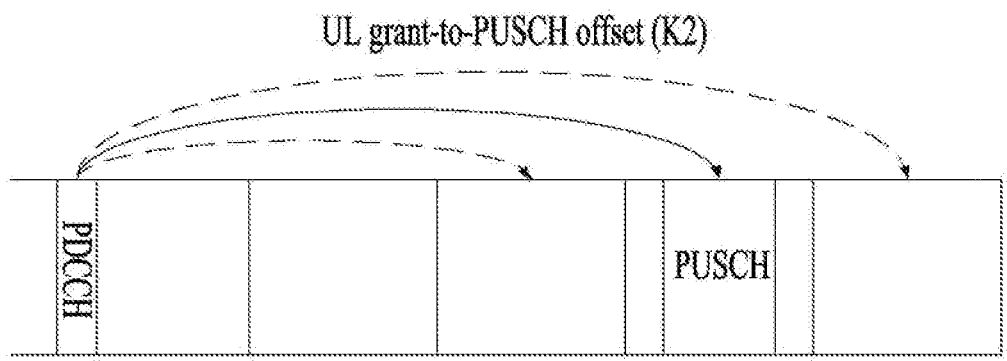
FIG. 7 illustrates an exemplary physical uplink shared channel (PUSCH) transmission process.
Figure 8:
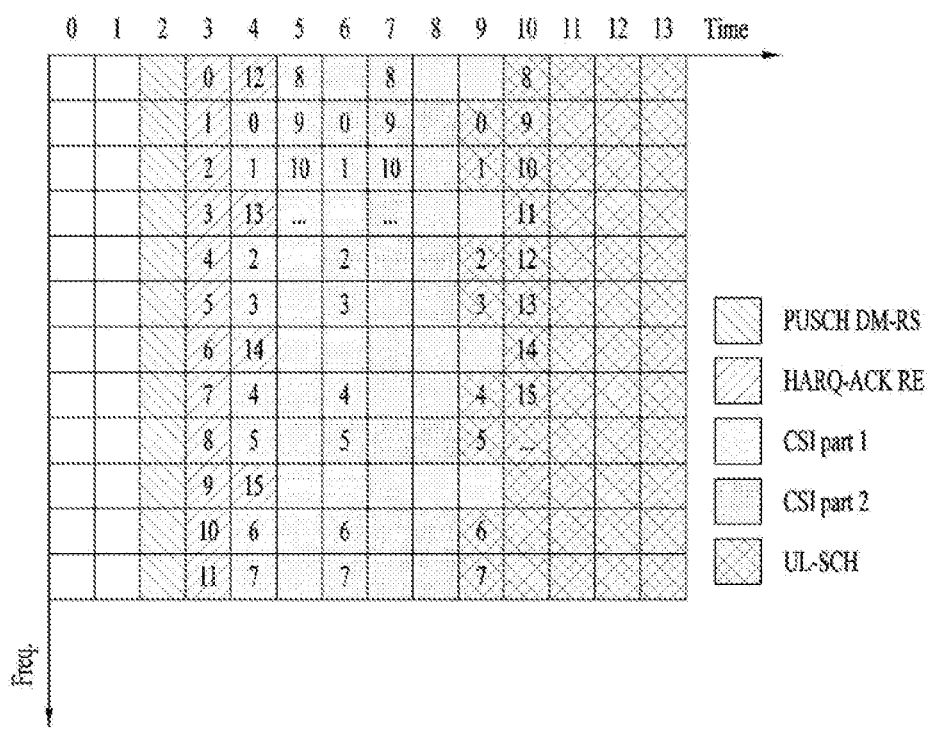
FIG. 8 illustrates an example of multiplexing control information in a PUSCH.

FIG. 5 illustrates exemplary mapping of physical channels in a slot. A PDCCH may be transmitted in a DL control region, and a PDSCH may be transmitted in a DL data region. A PUCCH may be transmitted in a UL control region, and a PUSCH may be transmitted in a UL data region. A guard period (GP) provides a time gap for transmission mode-to-reception mode switching or reception mode-to-transmission mode switching at a BS and a UE. Some symbol at the time of DL-to-UL switching in a subframe may be configured as a GP.

Each physical channel will be described below in greater detail.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH includes 1, 2, 4, 8, or 16 control channel elements (CCEs) according to its aggregation level (AL). A CCE is a logical allocation unit used to provide a PDCCH with a specific code rate according to a radio channel state. A CCE includes 6 resource element groups (REGs), each REG being defined by one OFDM symbol by one (P)RB. The PDCCH is transmitted in a control resource set (CORESET). A CORESET is defined as a set of REGs with a given numerology (e.g., an SCS, a CP length, and so on). A plurality of CORESETs for one UE may overlap with each other in the time/frequency domain. A CORESET may be configured by system information (e.g., a master information block (MIB)) or UE-specific higher-layer signaling (e.g., radio resource control (RRC) signaling). Specifically, the number of RBs and the number of symbols (3 at maximum) in the CORESET may be configured through higher-layer signaling.

For PDCCH reception/detection, the UE monitors PDCCH candidates. A PDCCH candidate is CCE(s) that the UE should monitor to detect a PDCCH. Each PDCCH candidate is defined as 1, 2, 4, 8, or 16 CCEs according to an AL. The monitoring includes (blind) decoding PDCCH candidates. A set of PDCCH candidates decoded by the UE are defined as a PDCCH search space (SS). An SS may be a common search space (CSS) or a UE-specific search space (USS). The UE may obtain DCI by monitoring PDCCH candidates in one or more SSs configured by an MIB or higher-layer signaling. Each CORESET is associated with one or more SSs, and each SS is associated with one CORESET. An SS may be defined based on the following parameters.

controlResourceSetId: A CORESET related to an SS.
monitoringSlotPeriodicityAndOffset: A PDCCH monitoring periodicity (in slots) and a PDCCH monitoring offset (in slots).
monitoringSymbolsWithinSlot: PDCCH monitoring symbols in a slot (e.g., the first symbol(s) of a CORESET).
nrofCandidates: The number of PDCCH candidates (one of 0, 1, 2, 3, 4, 5, 6, and 8) for each AL={1, 2, 4, 8, 16}.

An occasion (e.g., time/frequency resources) in which the UE is to monitor PDCCH candidates is defined as a PDCCH (monitoring) occasion. One or more PDCCH (monitoring) occasions may be configured in a slot.

Table 4 shows the characteristics of each SS.

TABLE 4

| Search Space | Type | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI or CS-RNTI(s) | |
| | UE Specific | C-RNTI, MCS-C-RNTI or CS-RNTI(s) | User Specific PDSCH decoding |

Table 5 shows DCI formats transmitted on the PDCCH.

TABLE 5

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword.

The PDSCH may deliver up to two codewords. Scrambling and modulation mapping may be performed on a codeword basis, and modulation symbols generated from each codeword may be mapped to one or more layers. Each layer together with a demodulation reference signal (DMRS) is mapped to resources, and an OFDM symbol signal is generated from the mapped layer with the DMRS and transmitted through a corresponding antenna port.

The PUCCH delivers uplink control information (UCI). The UCI includes the following information.

SR (Scheduling Request): Information used to request UL-SCH resources.

HARQ (Hybrid Automatic Repeat reQuest)-ACK (Acknowledgement): A response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term HARQ-ACK is interchangeably used with HARQ ACK/NACK and ACK/NACK.

CSI (Channel State Information): Feedback information for a DL channel. Multiple input multiple output (MIMO)-related feedback information includes an RI and a PMI.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be dynamically scheduled by a UL grant in DCI, or semi-statically scheduled by higher-layer (e.g., RRC) signaling (and/or Layer 1 (L1) signaling such as a PDCCH) (configured scheduling or configured grant). The PUSCH transmission may be performed in a codebook-based or non-codebook-based manner.

Initial DL BWP Selection and Common Channel Reception for Cell Access of UE

In general, the UE needs to support specific UE capability in order to access a cell. For example, to access an LTE cell, the UE needs to be capable of receiving an MIB and SIB(s) broadcast for the cell by the BS. Since there are several types of SIB (e.g., SIB1, SIB2 . . . , SIBx-y, etc.) and the SIB is transmitted in a plurality of PRBs, the UE intending to access the LTE cell needs to have an ability to receive a bandwidth of 20 MHz at least.

To access an NR cell, the UE needs to be capable of receiving an MIB in an SSB/PBCH transmitted in an initial DL BWP. Even when the UE is capable of receiving the SSB/PBCH, the UE also needs to check whether the UE is allowed to access the corresponding cell, based on cell access information included in SIB1. To this end, the UE may check whether there is a CORESET for a Type0-PDCCH common search space (CSS), based on the MIB. If the Type0-PDCCH CSS exists, the UE may determine CORSET #0 and a PDCCH occasion based on information in the MIB (e.g., pdcch-ConfigSIB1). Then, the UE may receive SIB1 over a PDSCH indicated by a PDCCH received on the corresponding PDCCH occasion.

Upon receiving the SIB, the UE needs to check various information to determine whether the UE is allowed to access the cell. If the information does not satisfy some conditions, the UE may set the corresponding cell as an access-prohibited cell. For example, the maximum UL channel bandwidth supported by the UE needs to be greater than or equal to the bandwidth of an initial UL BWP, and the maximum DL channel bandwidth supported by the UE needs be greater than or equal to the bandwidth of the initial DL BWP. If this condition is not satisfied, the UE may set the corresponding cell as the access-prohibited cell.

REL-17 NR intends to support anew type of UE with reduced capability. This type of UE is called an R-terminal or R-UE different from the legacy REL-15 UE.

Since the UE capability of the R-UE is limited compared to that of the legacy UE, a problem may occur in the cell access process. For example, the R-UE may be incapable of receiving the MIB in the initial DL BWP of the legacy NR cell. In addition, even if the R-UE is allowed to receive the MIB, the R-UE may be incapable of receiving a PDCCH scheduling CORSET #0 or SIB1. Alternatively, the maximum UL channel bandwidth or maximum DL channel bandwidth of the R-UE may not be greater than or equal to the bandwidth of the initial BWP supported by legacy NR cells. Alternatively, considering the numerology supported by the initial BWP of the legacy cell, the R-UE may not receive a paging message transmitted from the BS or may not perform UL RACH transmission for initial access due to the SCS. Due to these problems, a normal NR cell may be set as the access-prohibited cell frequently from the perspective of the R-UE.

The BS may need to provide a common channel transmission/reception method suitable for the R-UE at the beginning of the initial access process for the following reasons. First, the legacy UE may receive up to four transmissions: paging, MIB, SIB1, and unicast, based on frequency division multiplexing (FDM), but the number of channels that the R-UE is capable of simultaneously receiving may decrease due to the limited capability of the R-UE. Second, the numerology required for user services suitable for the R-UE may be different from the numerology accessible by normal UEs, and thus, the numerology of the initial BWP of the legacy cell may not be suitable for the R-UE. Third, the cell coverage of the R-UE may be reduced compared to that of the legacy UE due to limited RF capability. Finally, the R-UE may require an improved power saving technique compared to the legacy UE.

Therefore, the present disclosure proposes a method in which when an R-UE with limited capability performs initial access to a wireless network system through one cell, a BS managing the corresponding cell provides an initial DL BWP available to the R-UE. In particular, the BS may provide two or more initial DL BWPs for the cell, and the UE may select one initial DL BWP from among a plurality of initial DL BWPs depending on the capability supported by the UE. In addition, the UE may receive a common channel of the cell and then receive system information, paging messages, or RAR messages over the common channel.

The following operations may be provided in order for the UE to receive a DL common channel.

Figure 9:
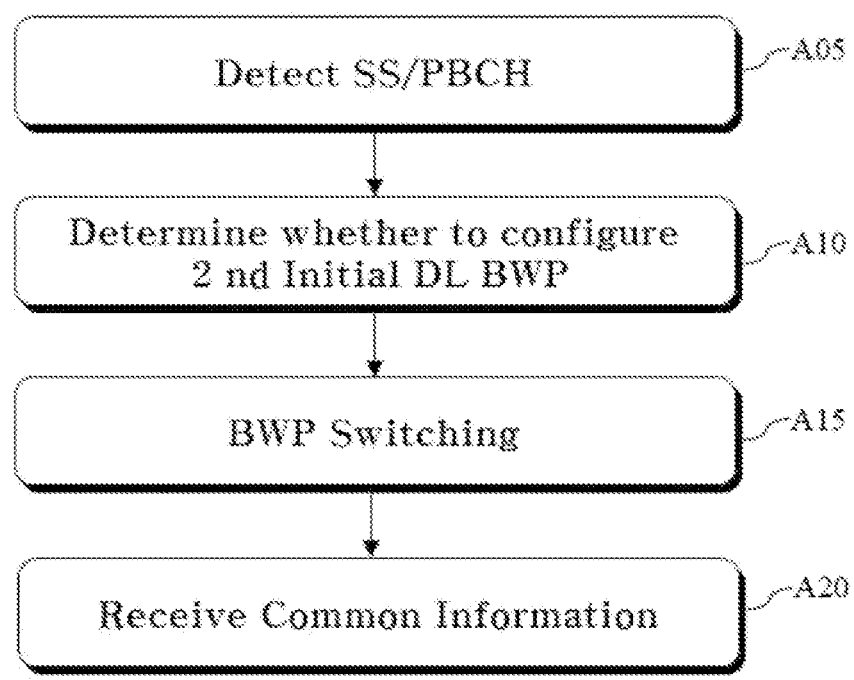
FIGS. 9 to 11 illustrate signal transmission and reception related to proposals of the present disclosure.

FIG. 9 is a diagram for explaining UE operations in an initial DL BWP according to an embodiment of the present disclosure.

Referring to FIG. 9, the UE may detect a synchronization channel and receive master information for a cell (A05). The synchronization channel may correspond to an SSB. The master information may correspond to an MIB.

The UE may determine whether to configure a second initial DL BWP compatible with a second type of UEs based on the capability of the UE (A10).

The second type of UEs may have reduced capability compared to a first type of UEs corresponding to Rel-15 NR UEs.

The second initial DL BWP may be compatible with at least the second type of UEs, while the first initial DL BWP may be compatible with at least the first type of UEs.

The second initial DL BWP may provide a smaller number of PRBs than the first initial DL BWP.

If the capability of the UE is incapable of supporting the first initial DL BWP of the cell, or if the second initial UL BWP is associated with the second type of UEs (the association may be indicated by system information of the cell), The UE may switch to the second initial DL BWP (A15) to receive a common channel carrying common information (A20).

The UE may activate the second initial DL BWP while deactivating the first initial DL BWP (A15).

For the UE, the priority of the second initial DL BWP may be higher than the priority of the first initial DL BWP.

The common channel or the common information may be prioritized over other channels or other information.

The UE may switch back to the first initial DL BWP to receive the synchronization channel and/or the master information (e.g., to perform idle measurement). The UE may activate the first initial DL BWP while deactivating the second initial DL BWP.

The UE may access to the cell based on the common information.

The UE may perform RF retuning to switch to one of the BWPs.

The common channel may correspond to one of a PDCCH, a PDSCH and a PBCH.

The common information may correspond to one of system information, system information modification, a short message, a paging message, a warning message, and a warning message indicator.

Hereinafter, the second initial DL BWP is referred to as an initial DL R-BWP, and the first initial DL BWP is referred to as a (legacy) initial DL BWP. In addition, the second type of UE is referred to as an R-terminal, an R-UE, or a UE (of the present disclosure), and the first type of UE is referred to as a legacy UE or a conventional UE.

1) SI Transmission Side (e.g., BS):

In an example of present disclosure, if the R-UE is incapable of receiving legacy SIB1 transmission, if legacy SIB1 is not related to the R-UE, or if the R-UE needs to receive additional R-UE-dedicated information in addition to the legacy SIB1 information, the R-UE may receive new SIB1. For convenience, SIB1 capable of being receiving by the R-UE is referred to as R-SIB1. R-SIB1 may include all or part of configuration information included in legacy SIB1, and R-SIB1 may also include configuration information dedicated to the R-UE. The legacy UE may not receive R-SIB1.

In this case, from the viewpoint of the BS, one cell needs to simultaneously operate two types of SIB1: SIB1 and R-SIB1. One type of MIB may be mapped to the two types of SIB1. Alternatively, an MIB may be mapped to legacy SIB1, and legacy SIB1 may be mapped to R-SIB1. Here, the mapping may mean logical mapping between SIBs that are related/linked to each other. In addition, legacy SIB1 and R-SIB1 may include scheduling information (e.g., schedulingInfoList) informing whether other SIBs are broadcast or not and transmission periods thereof.

One cell may simultaneously operate legacy SIBx and new SIBx. New SIBx may include R-UE-dedicated information or information not related to legacy UEs, which is referred to as R-SIBx. For example, in the case of SIB3 including infra-frequency cell reselection information, one cell may transmit legacy SIB3 and R-SIB3 together. In this case, legacy SIB3 may be used by the legacy UE to perform cell reselection, and R-SIB3 may be used by the R-UE to perform cell reselection. If legacy SIBx does not include R-UE-dedicated information, or if the R-UE-dedicated information is included only in R-SIBx, scheduling information for R-SIB1 may inform whether R-SIBx is broadcast and a transmission period thereof, and scheduling information for legacy SIB1 may inform whether legacy SIBx is broadcast and a transmission period thereof.

On the other hand, legacy SIBx may also include information related to for both the R-UE and the legacy UE. In this case, the scheduling information for legacy SIB1 and the scheduling information for R-SIB1 may schedule legacy SIBx together. For example, in the case of SIB6 or SIB7 broadcasting a public warning message, the scheduling information for legacy SIB1 and the scheduling information for R-SIB1 may schedule either SIB6 or SIB7 together. Alternatively, the scheduling information for legacy SIB1 and the scheduling information for R-SIB1 may schedule R-SIBx together.

2) SI Reception Side (e.g., UE):

[Proposal #1] when Selecting an Initial Cell, the R-UE May Proceed with a Legacy Initial DL BWP Until Receiving at Least an MIB from the Serving Cell. After Receiving the MIB, the R-UE May Switch to an Initial DL R-BWP and Perform System Information, Paging, and Random Access Operations.

Figure 10:
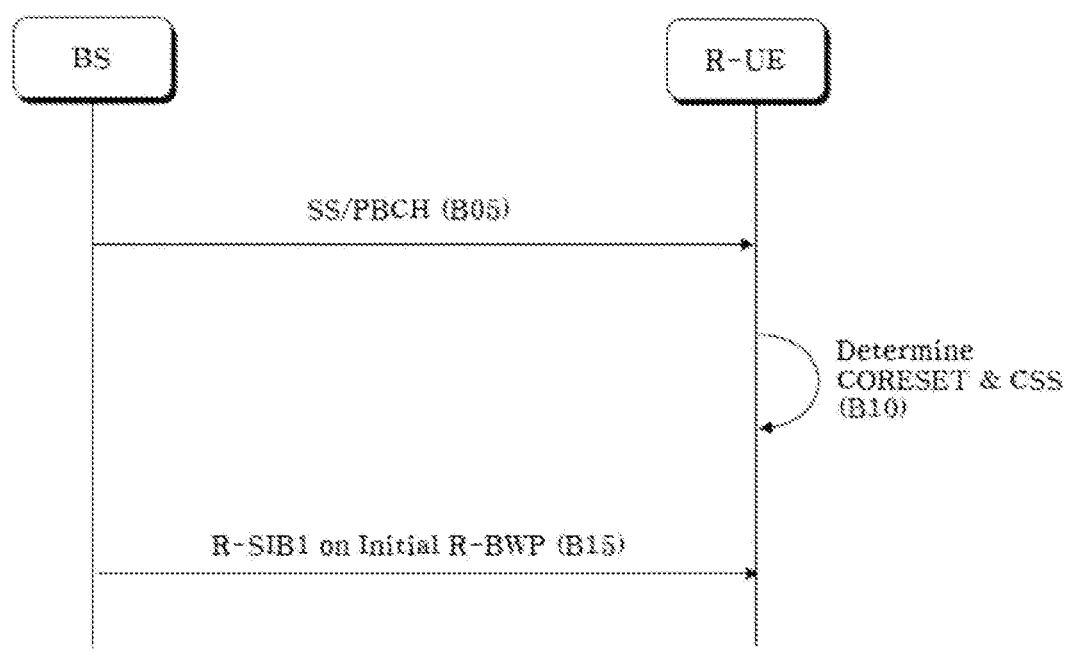

FIG. 10 illustrates an exemplary initial access process according to Proposal #1.

For example, the R-UE may receive an MIB from a selected cell during an initial cell selection process, a measurement process, and/or a mobility process such as handover (B05).

The R-UE may determine a CSS and/or CORESET0 for the R-UE (B10).

Figure 12:
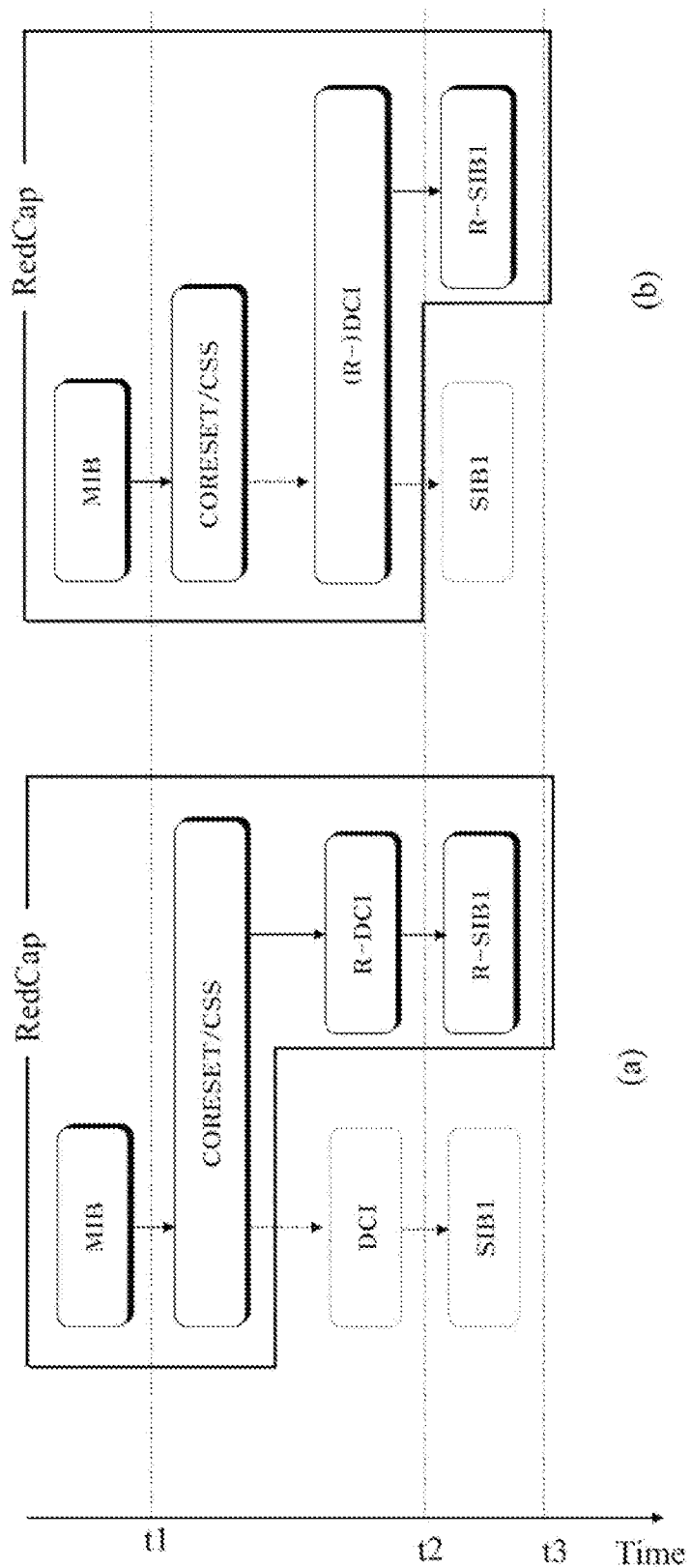
FIGS. 12 to 16 are diagrams for explaining initial DL BWP operation and system information reception related to the proposals of the present disclosure.
Figure 13:
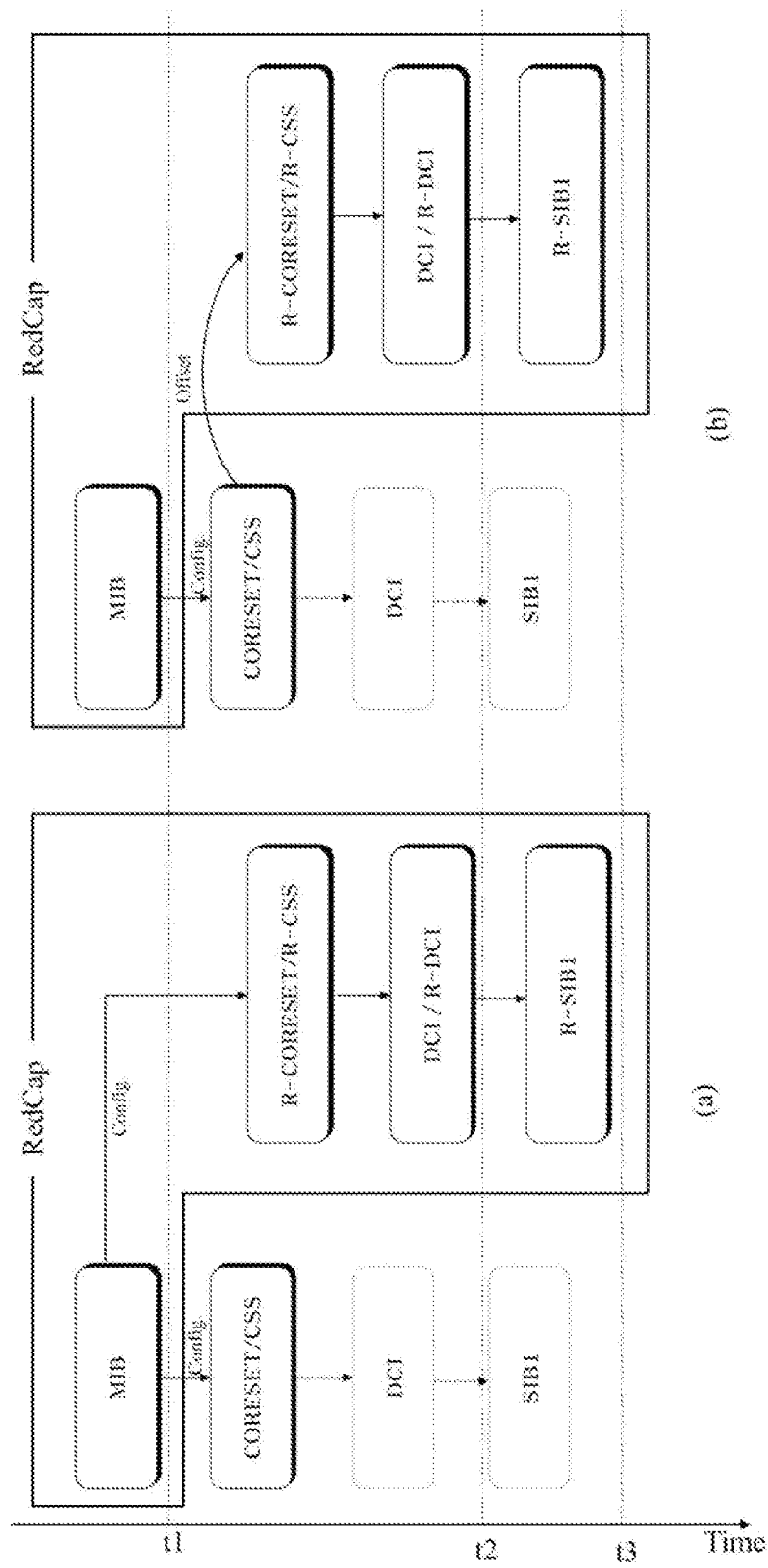

For example, the R-UE may check whether there is a CORESET for a Type0-PDCCH CSS, i.e., CORESET0, based on the received MIB. CORESET0 for the Type0-PDCCH CSS for the R-UE may be configured in common to both the legacy UE and R-UE (e.g., BWP switching to R-BWP at timing t1 in FIG. 12), or CORESET0 for the Type0-PDCCH CSS for the R-UE may be configured only for the R-UE (e.g., BWP switching to R-BWP at timing t1 in FIG. 13). For example, if the R-UE supports legacy CORESET0, legacy CORESET0 and a legacy Type0-PDCCH CSS may be defined/used as CORESET0 for the R-UE and the Type0-PDCCH CSS for the R-UE, respectively. In this case, the R-UE may receive a PDCCH in legacy CORESET0/CSS. On the other hand, if the R-UE is incapable of supporting legacy CORESET0, or if the R-UE is incapable of using legacy CORESET0, CORESET0 for the R-UE and the Type0-PDCCH CSS for the R-UE may be defined/configured/used, independently of legacy CORESET0 and the legacy Type0-PDCCH CSS. In this case, the R-UE may receive a PDCCH in CORESET0/CSS dedicated to the R-UE. A part or all of a Type0-PDCCH CSS for the legacy UE may be combined with an additional Type0-PDCCH CSS dedicated to the R-UE in order to configure a CSS for the R-UE.

For example, when the CSS for the R-UE exists in the initial cell selection process, the measurement process, and/or the mobility process such as handover, the UE may determine (i) a plurality of contiguous RBs and one or more contiguous symbols, which are included in CORESET0; and (ii) a PDCCH occasion (i.e., a time-domain location for PDCCH reception), based on information in the SSB or MIB (e.g., pdcch-ConfigSIB1). For example, CORESET0 determined by pdcch-ConfigSIB1 may be CORESET0 for the legacy UE, and CORESET0 for the R-UE may be configured by an offset from CORESET0 for the legacy UE (e.g., FIG. 13(b)). The position of CORESET0 for the R-UE may be determined such that the position of CORESET0 for the legacy UE is shifted by either or both of a time-domain offset or a frequency-domain offset. For example, the corresponding frequency-domain offset may be configured at the RB and/or RE level, and in this case, the RB level offset may vary for each frequency band. The frequency-domain offset may be defined as an offset between the first or last RB of an SSB/PBCH and the first RB of CORESET0 for the R-UE, or the frequency-domain offset may be defined as an offset between the first or last RB of legacy CORESET0 and the first or last RB of CORESET0 for the R-UE. On the other hand, the time-domain offset may be set to the number of symbols. When the offset is zero, CORESET0 for the R-UE may be defined in the same symbol as the SSB/PBCH or legacy CORESET0. When the offset is not zero, CORESET0 for the R-UE may be configured to be located before or after the time-domain offset from the SSB/PBCH or legacy CORESET0. The value or range of the offset may be signaled by the network (e.g., indicated by reserved bits of the MIB), or the offset may have a fixed value. As an example in which the value or range of the offset is fixed, a fixed offset value or a fixed offset range may be predefined/preconfigured for each frequency band.

For example, when there is no CSS for the R-UE during the initial cell selection process, the measurement process, and/or the mobility process such as handover, the PBCH payload (e.g., pdcch-ConfigSIB1 or other information in the MIB) may provide (i) information on a frequency location at which an SSB/SIB1 for the legacy UE or an SSB/R-SIB1 for the R-UE is expected; and/or (ii) information on a frequency range where there are no SSB/SIB1 for the legacy UE or no SSB/R-SIB1 for the R-UE (e.g., for UE re-direction). For example, the BS may indicate whether the provided information: information (i) and/or (ii) is for the legacy UE or for the R-UE, based on the MIB (e.g., using reserved bits of the MIB). For example, the BS may use the MIB (e.g., reserved bits of the MIB) to inform whether the R-UE needs to measure corresponding resources for cell reselection, mobility, or automatic neighbor relation (ANR). The R-UE may detect the frequency location of the SSB/R-SIB1 for the R-UE based on the provided information: information (i) and/or (ii). After receiving the MIB, the R-UE may determine CORESET0 and a PDCCH occasion (e.g., PDCCH monitoring occasion) for the R-UE.

The CSS and/or CORESET0 for the R-UE may be determined according to the above-described process. For example, if the CSS and CORESET0 for the R-UE are different from CORESET0 of the legacy UE, or if CORESET0 for the R-UE is out of the legacy initial DL BWP, the R-UE may determine that an initial DL R-BWP, which is determined in association with CORESET0 for the R-UE, is activated, active, or valid. On the other hand, the R-UE may determine that the initial DL BWP for the legacy UE is deactivated, inactive, or invalid.

In the NR system, PDCCH transmission and reception may be performed based on blind decoding of resources configured by a CORESET and search space set. The CORESET defines the region and characteristics of resources in which the PDCCH is capable of being transmitted. Regarding the resource region, the size and location of the CORESET in the frequency domain and the size of the CORESET in the time domain may be given by the BS (the time-domain location for monitoring a PDCCH candidate in the CORESET may be determined by the search space set).

As shown in FIG. 10, when the CSS is determined, the R-UE may detect a DCI format with a CRC scrambled by a specific RNTI by monitoring a PDCCH for scheduling R-SIB1 during a corresponding period. In this case, the specific RNTI may be a legacy SI-RNTI or an RNTI for R-SIB1 reception (e.g., R-UE-dedicated SI-RNTI). The DCI format may be defined as a legacy DCI format or a DCI format dedicated to the R-UE.

The DCI format for R-SIB1 may include at least some of the following information.

FDRA (Frequency domain resource assignment): Ceiling $[\log_2\{N_{RB}^{DL,BWP}(N_{RB}^{DL,BWP}+1)/2\}]$ bits, where $N_{RB}^{DL,BWP}$ is defined by the size of CORESET0.

TDRA (Time domain resource assignment)

VRB-to-PRB mapping

MCS (Modulation and coding scheme)

RV (Redundancy Version)

Aggregation factor: The aggregation factor indicates the number of times that R-SIB1 is repeatedly transmitted (repetition number).

SI (System information) indicator: The SI indicator indicates whether SIB1 is R-SIB1 or legacy SIB1 and/or whether SIBx is R-SIBx or legacy SIBx.

Reserved bit(s)

For the R-UE, R-SIB1 may include information similar to that in legacy SIB1. For example, R-SIB1 may include at least some of the following information.

Scheduling Information: Information on whether SIBx shared by the legacy UE and R-UE is broadcast or a transmission period thereof, or information on whether R-SIBx dedicated to the R-UE is broadcast or a transmission period thereof RACH Configuration Information: RACH configuration information shared by the legacy UE and R-UE or RACH configuration information dedicated to the R-UE Initial UL BWP Information: Initial UL BWP configuration information shared by the legacy UE and R-UE or initial UL BWP configuration information dedicated to the R-UE Access Control Information (Access Control Parameters): Probability-based access control information shared by the legacy UE and R-UE or probability-based access control information dedicated to the R-UE. When there are multiple types of R-UEs, the access control information may carry a different parameter value for each type of R-UE. The R-UE may determine whether UL transmission for initial access is allowed based on probability, using parameter values (e.g., barring factor and barring time) corresponding to the type of the R-UE.

The UE may request or receive transmission of R-SIBx dedicated to the R-UE based on the scheduling information.

Thereafter, the R-UE may receive an RAR (Msg2) or a contention resolution message (Msg4) in the initial DL R-BWP during the random access process. Then, the R-UE may receive a paging indicator or a paging message.

Meanwhile, priorities may be given to an MIB, SIB1, R-SIB1, and/or different (R-)SIBx. For example, the priorities may be configured by R-SIB1. When the MIB, SIB1, R-SIB1, SIBx, and/or R-SIBx overlap with each other (e.g., when the MIB, SIB1, R-SIB1, SIBx, and/or R-SIBx overlap or conflict in the time domain), if the R-UE needs to receive all (or some) of the overlapping system information but the R-UE is incapable of receiving the overlapping system information at the same time, the R-UE may receive selected information (e.g., including at least one of the MIB, SIB1, SIBx, and/or R-SIBx) according to the configured priorities.

[Proposal #2] when Selecting an Initial Cell, the R-UE May Proceed with a Legacy Initial DL BWP Until Receiving at Least a PDCCH for SIB1 from the Serving Cell. After Receiving the PDCCH, the R-UE May Switch to an Initial DL R-BWP and Perform System Information, Paging, and Random Access Operations.

Figure 11:
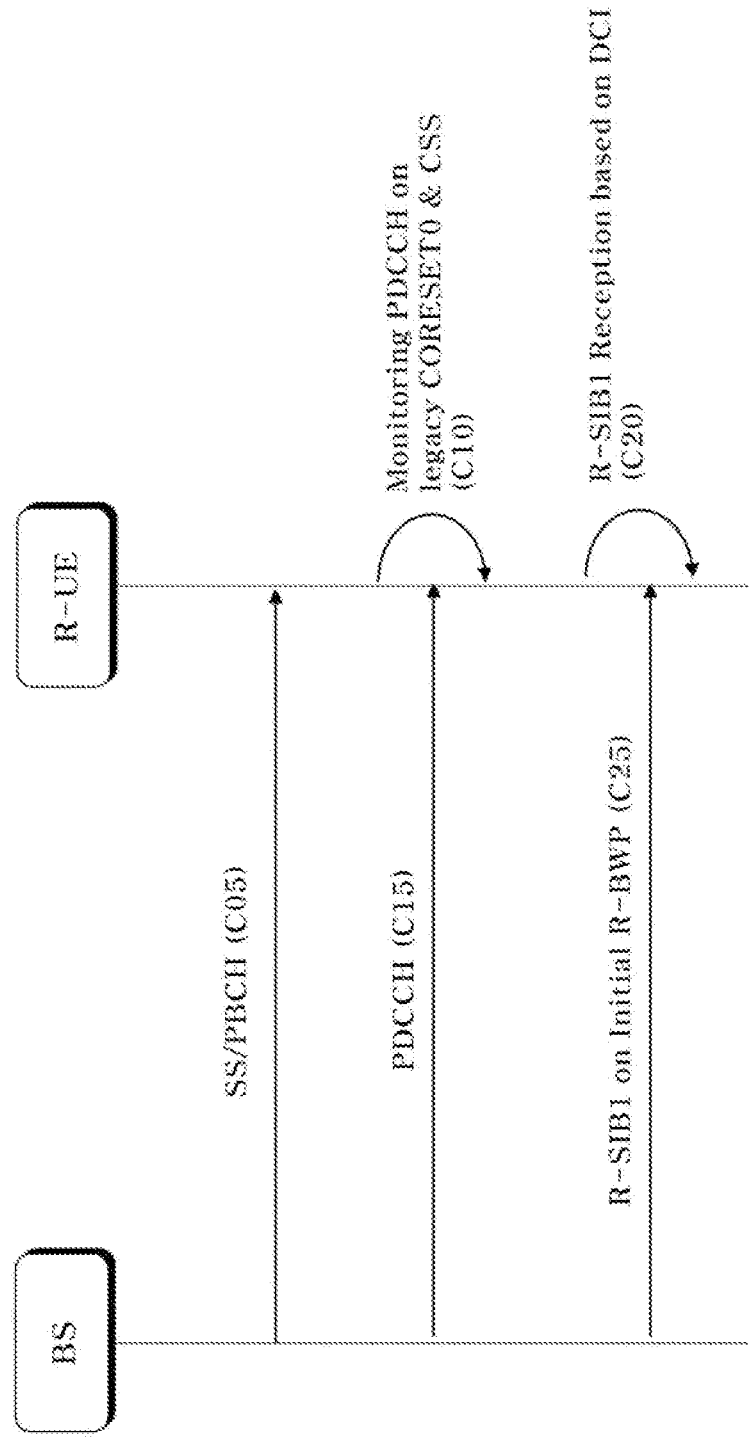

FIG. 11 illustrates an exemplary initial access process according to Proposal #2.

For example, the R-UE may receive an MIB from a selected cell during an initial cell selection process, a measurement process, and/or a mobility process such as handover (C05).

The R-UE may check whether there is a CORESET for a Type0-PDCCH CSS, i.e., CORESET0, based on the received MIB. If the R-UE supports legacy CORESET0, legacy CORESET0 and a legacy Type0-PDCCH CSS may be defined as CORESET0 for the R-UE and a Type0-PDCCH CSS for the R-UE, respectively. The R-UE may receive a PDCCH in the legacy CSS (C10 and C15). For example, since the R-UE supports legacy CORESET0 and the legacy CSS, the R-UE may also monitor the PDCCH in the same way as in the prior art (C10 and C15) (e.g., BWP switching to R-BWP at timing t2 in FIG. 12).

For example, when there is no CSS for the R-UE during the initial cell selection process, the measurement process, and/or the mobility process such as handover, the PBCH payload (e.g., pdcch-ConfigSIB1 or other information in the MIB) may provide (i) information on a frequency location at which an SSB/SIB1 for the legacy UE or an SSB/R-SIB1 for the R-UE is expected; and/or (ii) information on a frequency range where there are no SSB/SIB1 for the legacy UE or no SSB/R-SIB1 for the R-UE. For example, the BS may indicate whether the provided information: information (i) and/or (ii) is for the legacy UE or for the R-UE, based on the MIB (e.g., using reserved bits of the MIB). The BS may use the MIB (e.g., reserved bits of the MIB) to inform whether the R-UE needs to measure corresponding resources for cell reselection, mobility, or ANR. The R-UE may detect the frequency location of the SSB/R-SIB1 for the R-UE based on the provided information: information (i) and/or (ii). After receiving the MIB, the R-UE may determine CORESET0 and a PDCCH occasion for the R-UE.

Based on the CSS, the R-UE may detect a DCI format with a CRC scrambled by a specific RNTI by monitoring a PDCCH for scheduling R-SIB1 during a corresponding period. In this case, the specific RNTI may be a legacy SI-RNTI or an RNTI for receiving R-SIB1 dedicated to the R-UE. During the PDCCH reception operation, the R-UE may determine that a legacy initial DL BWP is activated and an initial DL R-BWP is deactivated. In this case, the DCI format is defined as a legacy DCI format (e.g., DCI of FIG. 12(b)) or a DCI format dedicated to the R-UE (e.g., R-DCI of FIG. 12(a)/(b)).

At least some of the following information may be transmitted by the DCI format for R-SIB1.

FDRA: Ceiling $[\log_2\{N_{RB}^{DL,BWP}(N_{RB}^{DL,BWP}+1)/2\}]$ bits, where $N_{RB}^{DL,BWP}$ is defined by the size of CORESET0.

Information on CORESET0 only for the R-UE

1) Frequency-domain offset: The position of CORESET0 for the R-UE relative to the frequency position at which the PDCCH is transmitted may be indicated by an offset. The corresponding frequency-domain offset may be configured at the RB and/or RE level, and in this case, the RB level offset may vary for each frequency band. Alternatively, the frequency-domain offset may be defined as an offset between the first or last RB of an SSB/PBCH and the first RB of CORESET0 for the R-UE, or the frequency-domain offset may be defined as an offset between the first or last RB of legacy CORESET0 and the first or last RB of CORESET0 for the R-UE.

2) Time-domain offset: The symbols of CORESET0 for the R-UE relative to the symbols in which the PDCCH is transmitted may be indicated by an offset. The time-domain offset may be set to the number of symbols. Alternatively, CORESET0 for the R-UE may be configured to be located before or after the time-domain offset from an SSB/PBCH or legacy CORESET0.

TDRA (Time domain resource assignment)
VRB-to-PRB mapping
MCS (Modulation and coding scheme)
RV (Redundancy Version)
Aggregation factor: The aggregation factor indicates the number of times that R-SIB1 is repeatedly transmitted (repetition number).
SI indicator: The SI indicator indicates whether SIB1 is R-SIB1 or legacy SIB1 and/or whether SIBx is R-SIBx or legacy SIBx.
Reserved bit(s)

The UE may attempt to receive R-SIB1 over a PDSCH based on information included in DCI (C20).

To this end, the UE may determine that the initial DL R-BWP associated with R-SIB1 transmission resources or the initial DL R-BWP determined in association with CORESET0 for the R-UE is activated, active, or valid. On the other hand, the R-UE may determine that the initial DL BWP for the legacy UE is deactivated, inactive, or invalid.

For example, the contents of R-SIB1 may be the same as those described in Proposal #1.

Alternatively, the R-UE may maintain both the initial DL BWP and the initial DL R-BWP in the active state and switch between the two BWPs, so that the R-UE may alternately receive the PDCCH in the initial DL BWP and R-SIB1 in the initial DL R-BWP. Upon receiving R-SIB1 in the active initial DL R-BWP, the UE may request or receive R-SIBx transmission dedicated to the R-UE based on the scheduling information as in Proposal #1.

After switching to the initial DL R-BWP, the UE may monitor R-SIB1 in the initial DL R-BWP based on CORESET0 information dedicated to the R-UE included in the DCI. As long as the R-UE receives CORESET0 dedicated to the R-UE (e.g., as long as the R-UE receives a PDCCH scheduling R-SIB1), the R-UE does not need to switch to the legacy initial DL BWP for monitoring the PDCCH. Similarly as described in Proposal #1, if the CSS and CORESET0 for the R-UE are different from CORESET0 of the legacy UE, or if CORESET0 for the R-UE is out of the initial legacy DL BWP, the UE may determine that the initial DL R-BWP determined in association with CORESET0 for the R-UE is activated, active, or valid. On the other hand, the UE may determine that the initial DL BWP is deactivated, inactive, or invalid.

Thereafter, the R-UE may receive an RAR (Msg2) or a contention resolution message (Msg4) in the initial DL R-BWP in the random access process. Then, the R-UE may receive a paging indicator or a paging message.

Meanwhile, priorities may be given to an MIB, SIB1, R-SIB1, and/or different (R-)SIBx. For example, the priorities may be configured by R-SIB1. When the MIB, SIB1, R-SIB1, SIBx, and/or R-SIBx overlap with each other (e.g., when the MIB, SIB1, R-SIB1, SIBx, and/or R-SIBx overlap or conflict in the time domain), if the R-UE needs to receive all (or some) of the overlapping system information but the R-UE is incapable of receiving the overlapping system information at the same time, the R-UE may receive selected information (e.g., including at least one of the MIB, SIB1, SIBx, and/or R-SIBx) according to the configured priorities.

[Proposal #3] when Selecting an Initial Cell, the R-UE May Proceed with a Legacy Initial DL BWP Until Receiving at Least SIB1 from the Serving Cell. After Receiving SIB1, the R-UE May Switch to an Initial DL R-BWP to Receive Additional R-SIB1 and Perform SIBx Reception, Paging, and Random Access Operations.

For example, the R-UE may receive an MIB from a selected cell during an initial cell selection process, a measurement process, and/or a mobility process such as handover.

Figure 14:
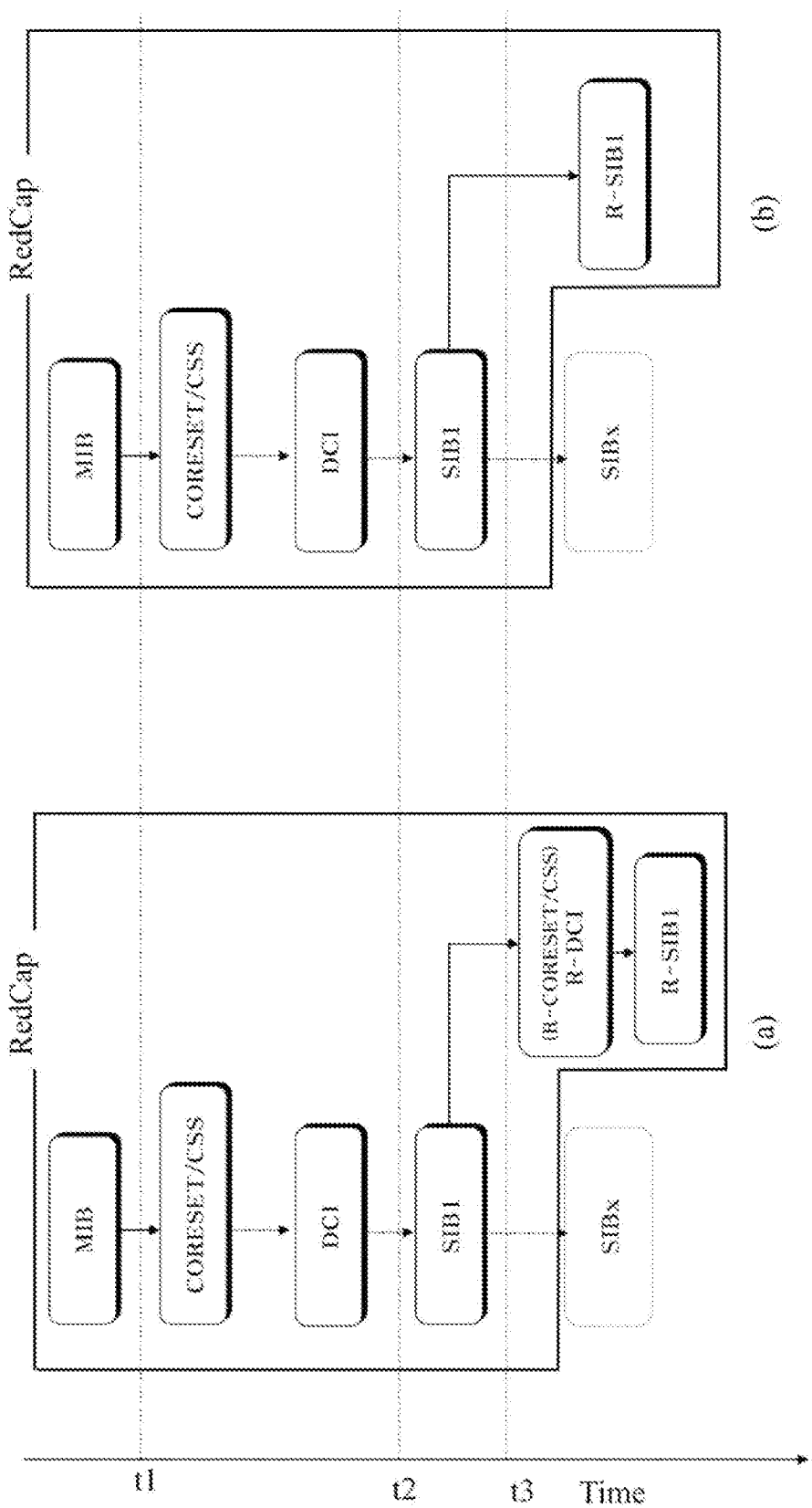

The R-UE may check whether there is a CORESET for a Type0-PDCCH CSS, i.e., CORESET0, based on the received MIB. When the R-UE supports legacy CORESET0, legacy CORESET0 and a legacy Type0-PDCCH CSS may be defined as CORESET0 for the R-UE and a Type0-PDCCH CSS for the R-UE, respectively. The R-UE may receive a PDCCH in the legacy CSS. For example, since the R-UE supports legacy CORESET0 and the legacy CSS, the R-UE may also monitor the PDCCH in the same way as in the prior art. Thereafter, the R-UE may receive SIB1 shared by the legacy UE and the R-UE based on legacy DCI received over a legacy PDCCH (e.g., FIG. 14).

In this case, legacy SIB1 may include at least some of the following information. After receiving legacy SIB1, the R-UE may receive R-SIB1 by switching to the initial DL R-BWP based on this information (e.g., BWP switching to R-BWP at timing t3 shown in FIG. 14). Here, the R-UE may receive DCI in the initial DL R-BWP to receive R-SIB1 (e.g., FIG. 14(a)), or the R-UE may receive R-SIB1 without receiving DCI (e.g., FIG. 14(b)).

FDRA: Ceiling $[\log_2\{N_{RB}^{DL,BWP}(N_{RB}^{DL,BWP}+1)/2\}]$ bits, where $N_{RB}^{DL,BWP}$ is defined by the size of CORESET0.

Information on CORESET0 only for the R-UE

1) Frequency-domain offset: The position of CORESET0 for the R-UE relative to the frequency position at which the PDCCH is transmitted may be indicated by an offset. The corresponding frequency-domain offset may be configured at the RB and/or RE level, and in this case, the RB level offset may vary for each frequency band. Alternatively, the frequency-domain offset may be defined as an offset between the first or last RB of an SSB/PBCH and the first RB of CORESET0 for the R-UE, or the frequency-domain offset may be defined as an offset between the first or last RB of legacy CORESET0 and the first or last RB of CORESET0 for the R-UE.

2) Time-domain offset: The symbols of CORESET0 for the R-UE may be indicated by an offset, compared to the symbols in which the PDCCH is transmitted. The time-domain offset may be set to the number of symbols. Alternatively, CORESET0 for the R-UE may be configured to be located before or after the time-domain offset from an SSB/PBCH or legacy CORESET0.

TDRA (Time domain resource assignment)
VRB-to-PRB mapping
MCS (Modulation and coding scheme)
RV (Redundancy Version)
Aggregation factor: The aggregation factor indicates the number of times that R-SIB1 is repeatedly transmitted (repetition number).

Figure 15:
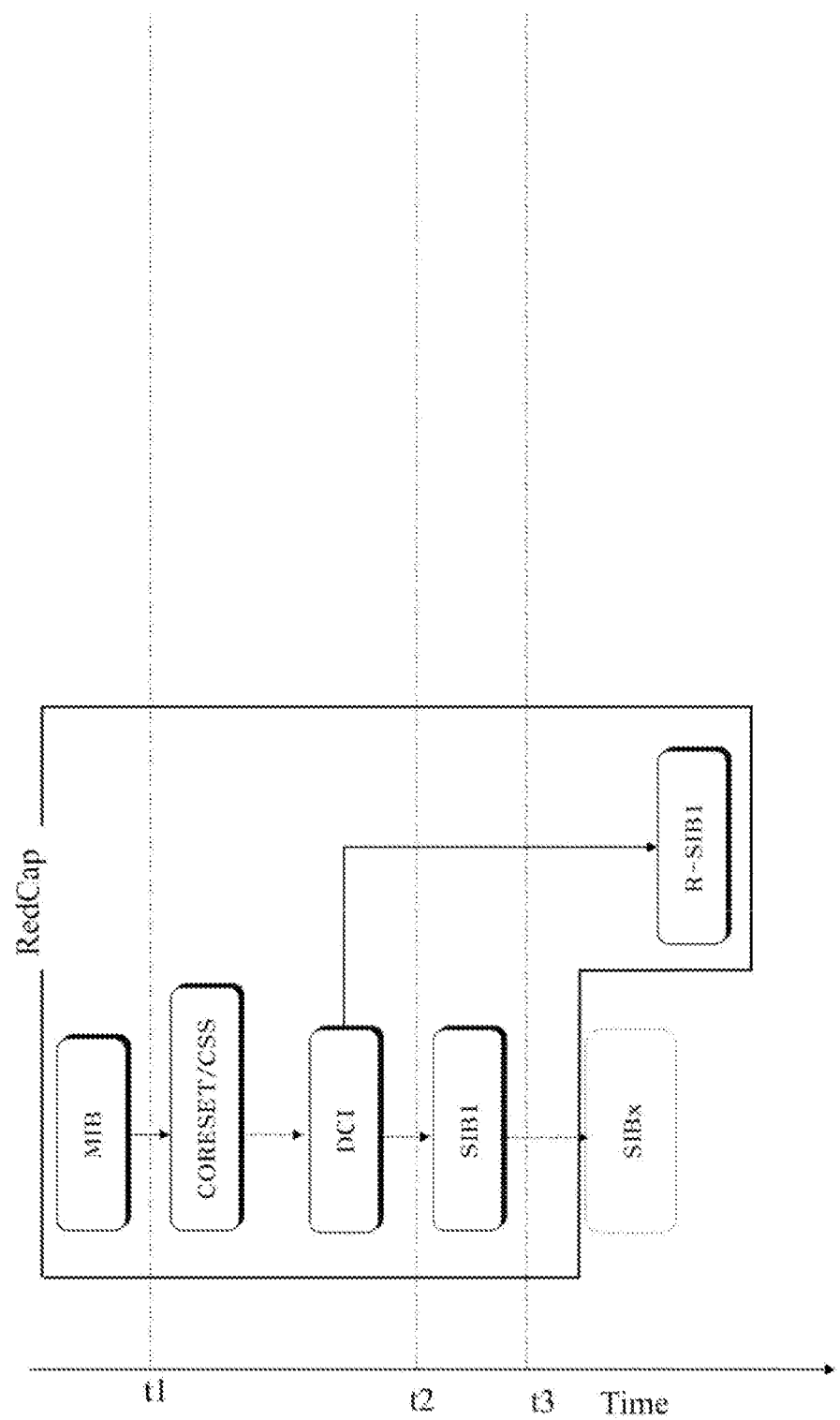

The R-UE may additionally receive DCI for receiving R-SIB1 similarly as described in Proposal #2 (e.g., FIG. 14(a)). After receiving legacy SIB1, the UE may switch to the initial DL R-BWP (e.g., BWP switching to R-BWP at timing t3 shown in FIG. 14(a)) and receive R-SIB1 based on the additional DCI. Alternatively, the R-UE may receive R-SIB1 transmission information such as the DCI format of Proposal #2 with reserved bits of the legacy DCI (e.g., DCI for scheduling SIB1). Accordingly, the R-UE may receive R-SIB1 by switching to the initial DL R-BWP with no additional DCI reception (e.g., BWP switching to R-BWP at timing t3 in FIG. 15).

To this end, the UE may determine that the initial DL R-BWP associated with R-SIB1 transmission resources is activated, active, or valid. On the other hand, the R-UE may determine that the initial DL BWP for the legacy UE is deactivated, inactive, or invalid. Alternatively, the R-UE may maintain both the initial DL BWP and the initial DL R-BWP in the active state and switch between the two BWPs, so that the R-UE may alternately receive the two SIB1s.

For the R-UE, legacy SIB1 or R-SIB1 may include some or all of the following information. In particular, at least some of the following information may be included.

Scheduling Information: Information on whether SIBx shared by the legacy UE and R-UE is broadcast or a transmission period thereof, or information on whether R-SIBx dedicated to the R-UE is broadcast or a transmission period thereof RACH Configuration Information: RACH configuration information shared by the legacy UE and R-UE or RACH configuration information dedicated to the R-UE Initial UL BWP Information: Initial UL BWP configuration information shared by the legacy UE and R-UE or initial UL BWP configuration information dedicated to the R-UE Access Control Information (Access Control Parameters): Probability-based access control information shared by the legacy UE and R-UE or probability-based access control information dedicated to the R-UE. When there are multiple types of R-UEs, the access control information may carry a different parameter value for each type of R-UE. The R-UE may determine whether UL transmission for initial access is allowed based on probability, using parameter values (e.g., barring factor and barring time) corresponding to the type of the R-UE.

For example, scheduling information for legacy SIBx and initial UL BWP information may be included and transmitted in legacy SIB1, and scheduling information for R-SIBx, initial UL R-BPW information, RACH configuration information, and access control information, which are dedicated to the R-UE, may be included and transmitted in R-SIB1.

Thereafter, the UE may request or receive transmission of R-SIBx based on the scheduling information in R-SIB1. The R-UE may receive an RAR or a contention resolution message in the initial DL R-BWP in the random access process. Then, the R-UE may receive a paging indicator or a paging message.

Meanwhile, priorities may be given to an MIB, SIB1, R-SIB1, and/or different (R-)SIBx. The priorities may be configured by SIB1 or R-SIB1. When the MIB, SIB1, R-SIB1, SIBx, and/or R-SIBx overlap with each other (e.g., when the MIB, SIB1, R-SIB1, SIBx, and/or R-SIBx overlap or conflict in the time domain), if the R-UE needs to receive all (or some) of the overlapping system information but the R-UE is incapable of receiving the overlapping system information at the same time, the R-UE may receive selected information (e.g., including at least one of the MIB, SIB1, SIBx, and/or R-SIBx) according to the configured priorities. [Proposal #4] when Selecting an Initial Cell, the R-UE May Proceed with a Legacy Initial DL BWP Until Receiving at Least SIB1 from the Serving Cell. After Receiving SIB1, the R-UE May Switch to an Initial DL R-BWP and Perform SIBx Reception, Paging, and Random Access Operations.

For example, the R-UE may receive an MIB from a selected cell during an initial cell selection process, a measurement process, and/or a mobility process such as handover.

The R-UE may check whether there is a CORESET for a Type0-PDCCH CSS, i.e., CORESET0, based on the received MIB. When the R-UE supports legacy CORESET0, legacy CORESET0 and a legacy Type0-PDCCH CSS may be defined as CORESET0 for the R-UE and a Type0-PDCCH CSS for the R-UE, respectively. The R-UE may receive a PDCCH in the legacy CSS. For example, since the R-UE supports legacy CORESET0 and the legacy CSS, the R-UE may also monitor the PDCCH in the same way as in the prior art. Thereafter, the R-UE may receive SIB1 shared by the legacy UE and the R-UE based on legacy DCI received over a legacy PDCCH. In this case, the contents of SIB1 may be the same as those described in Proposal #1. (e.g., FIG. 16).

Figure 16:
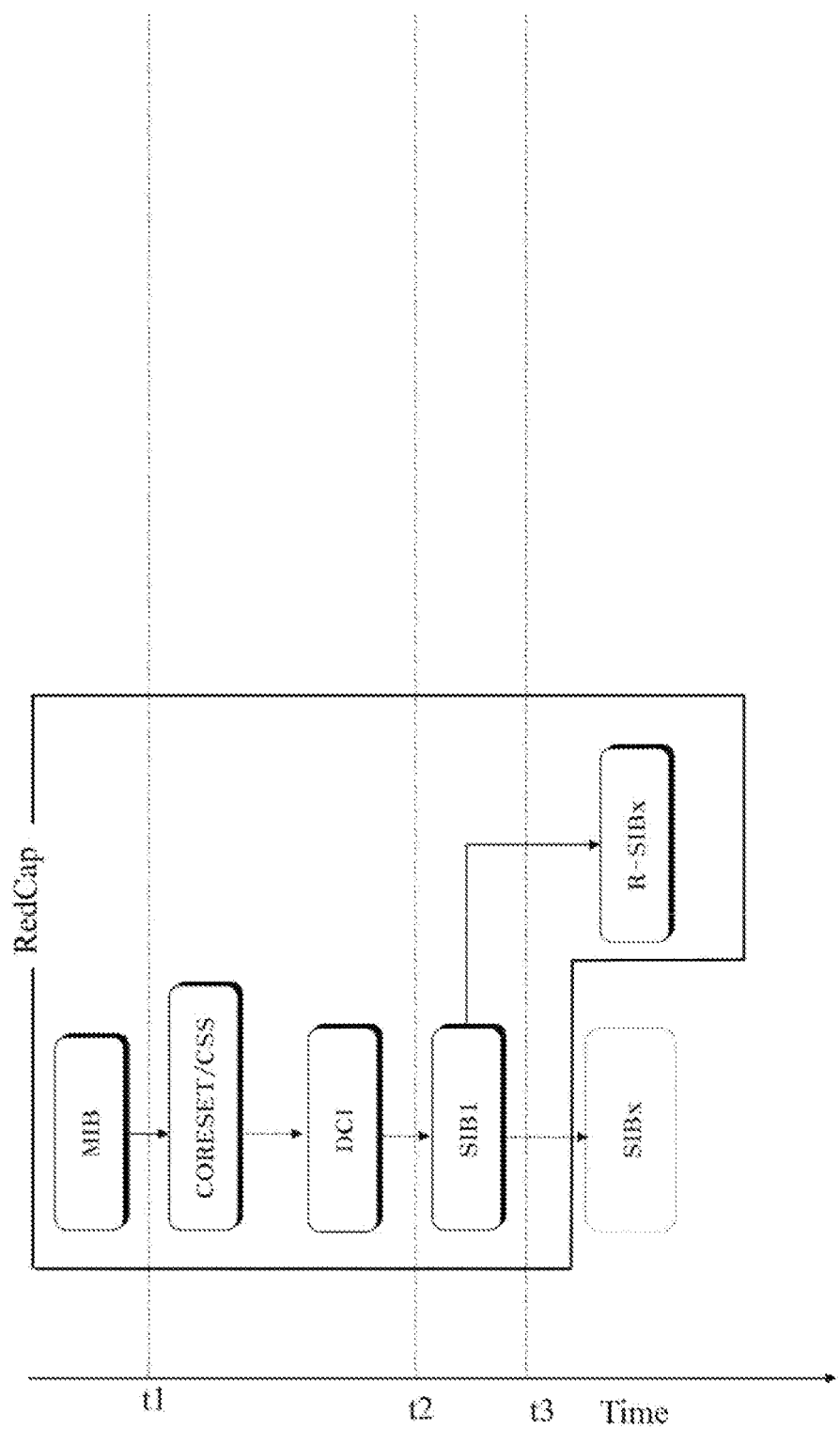

The UE may request or receive transmission of R-SIBx based on scheduling information in R-SIB1 (e.g., BWP switching to R-BWP at timing t3 in FIG. 16). To this end, the R-UE may determine that the initial DL R-BWP associated with R-SIBx transmission resources is activated, active, or valid. On the other hand, the R-UE may determine that the initial DL BWP for the legacy UE is deactivated, inactive, or invalid. Alternatively, the R-UE may maintain both the initial DL BWP and the initial DL R-BWP in the active state and switch between the two BWPs, so that the R-UE may periodically receive both SIB1 and R-SIBx in different time durations.

The R-UE may receive an RAR or a contention resolution message in the initial DL R-BWP in the random access process. Then, the R-UE may receive a paging indicator or a paging message.

Meanwhile, priorities may be given to an MIB, SIB1 and/or different (R-)SIBx. The priorities may be configured by SIB1. When the MIB, SIB1, SIBx and/or R-SIBx overlap (e.g., when the MIB, SIB1, SIBx and/or R-SIBx overlap or conflict in the time domain), if the R-UE needs to receive all (or some) of the overlapping system information but the R-UE is incapable of receiving the overlapping system information at the same time, the R-UE may receive selected information (e.g., including at least one of the MIB, SIB1, SIBx, and/or R-SIBx) according to the configured priorities.

According to the above-mentioned proposals, the initial DL R-BWP dedicated to the R-UE may be efficiently provided. Accordingly, the R-UE supporting limited UE capability compared to legacy UEs may successfully perform the cell access process and coexist with the legacy UEs.

Figure 17:
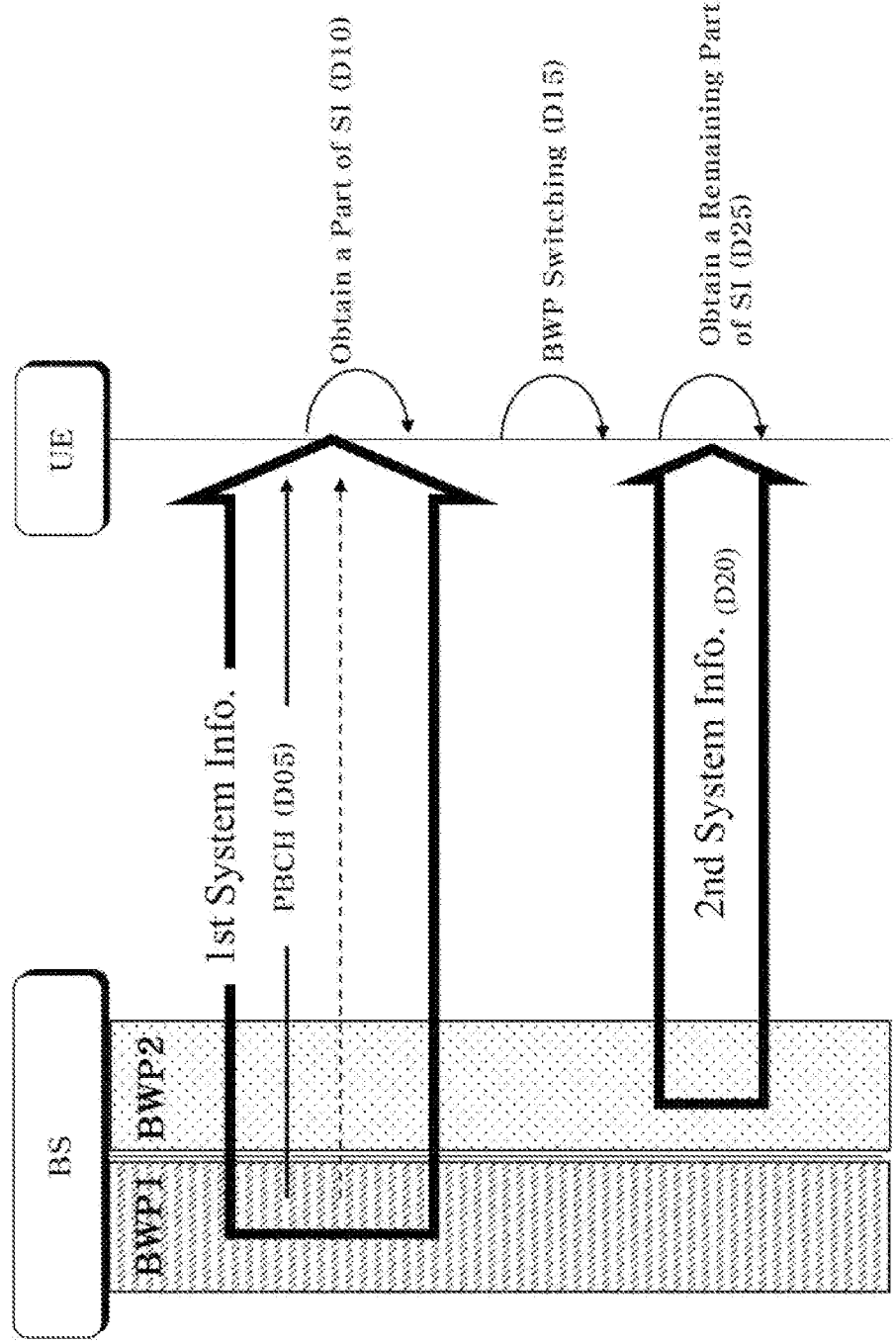
FIG. 17 illustrates signal transmission and reception related to the proposals of the present disclosure.

FIG. 17 illustrates an exemplary signal transmission/reception method based on the above-mentioned proposals. FIG. 17 is one of examples to which present disclosure is applicable, and the present disclosure is not limited to the example of FIG. 17. The above-described details may be referred to for illustration of FIG. 17 even if not explicitly stated.

A BS may transmit a PBCH signal in an SSB on a first DL BWP (e.g., BWP1 of FIG. 17) (D05). A UE may detect the PBCH signal in the SSB on the first DL BWP. The UE may obtain partial system information including an MIB carried by the PBCH signal from among first system information provided on the first DL BWP (D10).

The BS may transmit second system information on a second DL BWP different from the first DL BWP (D20). The BS may support a first type of UE (e.g., Rel. 15/16 NR UE) and a second type of UE (e.g., Rel. 17+RedCap UE) with reduced capability to support a smaller bandwidth than the first type of UE. The BS may provide the second type of UE with the partial system information including the MIB carried by the PBCH signal by transmitting the first system information on the first DL BWP. The BS may provide the second type of UE with remaining system information by transmitting the second system information on the second DL BWP.

Based that the UE is the second type of UE with the reduced capability to support the smaller bandwidth than the first type of UE, the UE may perform BWP switching from the first DL BWP to the second DL BWP (D15). The UE may obtain the second system information provided on the second DL BWP as remaining parts except for the partial system information obtained on the first DL BWP (D25).

The UE may perform cell access based on a plurality of initial DL BWPs.

The first DL BWP and the second DL BWP may be a first initial DL BWP and a second initial DL BWP, respectively.

The first DL BWP may be related to a bandwidth of the first type of UE, and the second DL BWP may be related to a bandwidth of the second type of UE.

The PBCH signal on the first DL BWP may be a common signal for the first type of UE and the second type of UE.

The second system information may be information for the second type of UE other than the first type of UE. The second system information may include at least one second-type SIB for the second type of UE.

Obtaining, by the UE, the partial system information on the first DL BWP may include: obtaining a first CORESET configuration and a first CSS configuration from the MIB, wherein the first CORESET configuration and the first CSS configuration are related to control information scheduling first-type SIB1 for the first type of UE; and obtaining the first-type SIB1 based on the first CORESET configuration and the first CSS configuration.

Obtaining, by the UE, the second system information on the second DL BWP may include obtaining at least one second-type SIB provided on the second DL BWP based on the first-type SIB1.

Obtaining, by the UE, the partial system information on the first DL BWP may include obtaining a first CORESET configuration and a first CSS configuration from the MIB, wherein the first CORESET configuration and the first CSS configuration are related to control information scheduling first-type SIB1 for the first type of UE.

Obtaining, by the UE, the second system information on the second DL BWP may include:—obtaining at least one of a second CORESET configuration or a second CSS configuration on the second DL BWP by applying a time/frequency offset to at least one of the first CORESET configuration or the first CSS configuration; and obtaining at least one second-type SIB provided on the second DL BWP based on the at least one of the second CORESET configuration or the second CSS configuration.

Figure 18:
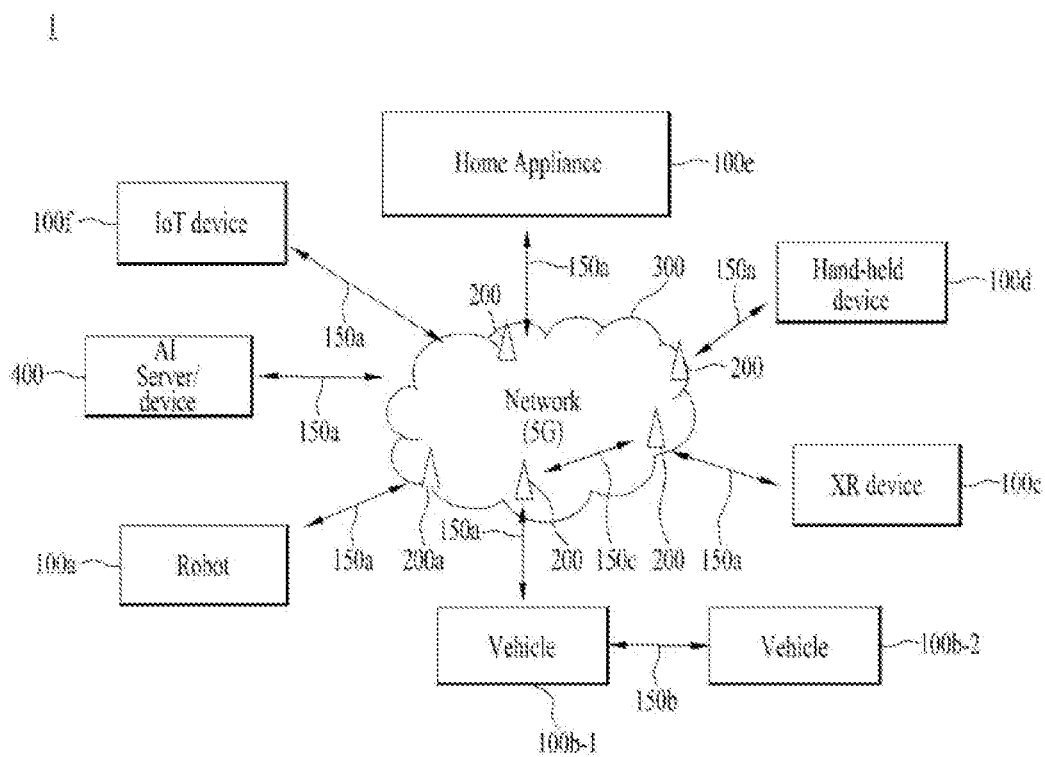
FIGS. 18 and 19 illustrate a communication system 1 and wireless devices applied to the present disclosure.

FIG. 18 illustrates a communication system 1 applied to the present disclosure.

Referring to FIG. 18, a communication system 1 includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smart-glasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 19:
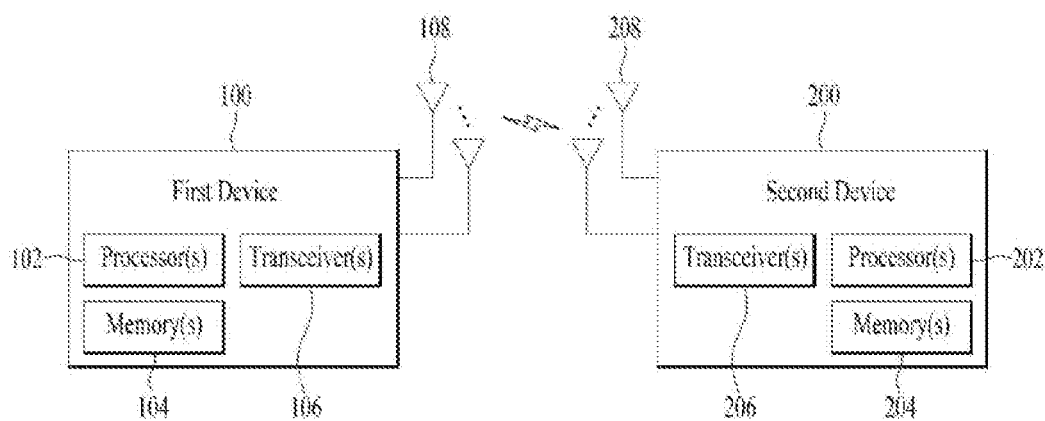

FIG. 19 illustrates wireless devices applicable to the present disclosure.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 20:
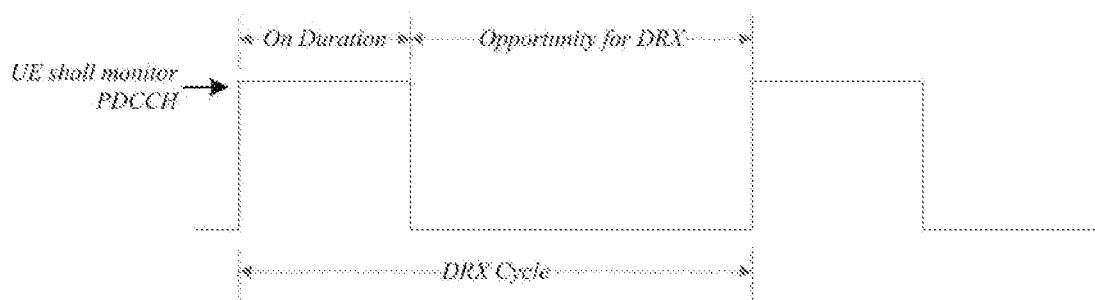
FIG. 20 illustrates discontinuous reception (DRX) operation applicable to the present disclosure.

FIG. 20 is a diagram illustrating a DRX operation of a UE according to an embodiment of the present disclosure.

The UE may perform a DRX operation in the aforedescribed/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

A DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

The above-described embodiments are combinations of elements and features of the present disclosure in specific forms. The elements or features may be considered selective unless mentioned otherwise. Each element or feature may be implemented without being combined with other elements or features. Further, the embodiments of the present disclosure may be configured by combining some elements and/or some features. Operation orders described in the embodiments of the present disclosure may be rearranged. Some constructions or features of any one embodiment may be included in another embodiment or may be replaced with corresponding constructions or features of another embodiment. It is obvious that claims that are not explicitly cited in the appended claims may be presented in combination as an embodiment of the present disclosure or included as a new claim by subsequent amendment after the application is filed.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, BSs, or other apparatuses in a wireless mobile communication system.

What is claimed is:

1. A method of receiving a signal by a user equipment (UE) in a wireless communication system, the method comprising:

receiving a master system information block (MIB); and
receiving a first system information block (SIB) based on the MIB,
wherein the first SIB includes information regarding a first initial downlink bandwidth part (DL BWP) and information regarding a second initial DL BWP, the second initial DL BWP being present for a reduced capability (RedCap) UE,
wherein, based on the UE being the RedCap UE, the UE uses the second initial DL BWP instead of the first initial DL BWP,
wherein, based on the second initial DL BWP being an active DL BWP of the UE, the UE assumes that the second initial DL BWP includes a synchronization signal (SS)/physical broadcast channel (PBCH) block that is related to the UE's reception of a control resource set (CORESET) with an index 0,
wherein the first SIB includes information regarding a first initial UL BWP and information regarding a second initial UL BWP for the RedCap UE, and
wherein the UE performs a random access procedure in the second initial UL BWP based on a second random access channel (RACH) configuration provided for the second initial UL BWP for the RedCap UE other than a first RACH configuration for the first initial UL BWP.

2. The method of claim 1, wherein the second initial DL BWP does not exceed a maximum bandwidth of the RedCap UE.

3. The method of claim 1, wherein the MIB is common for a non-RedCap UE and the RedCap UE.

4. The method of claim 1, wherein the first SIB includes SIB1.

5. A user equipment (UE) in a wireless communication system, the UE comprising:
a transceiver;
a memory configured to store instructions; and
a processor configured to perform operations by executing the instructions, the operations comprising:
receiving a master system information block (MIB); and
receiving a first system information block (SIB) based on the MIB,
wherein the first SIB includes information regarding a first initial downlink bandwidth part (DL BWP) and information regarding a second initial DL BWP, the second initial DL BWP being present for a reduced capability (RedCap) UE,
wherein, based on the UE being the RedCap UE, the UE uses the second initial DL BWP instead of the first initial DL BWP,
wherein, based on the second initial DL BWP being an active DL BWP of the UE, the UE assumes that the second initial DL BWP includes a synchronization signal (SS)/physical broadcast channel (PBCH) block that is related to the UE's reception of a control resource set (CORESET) with an index 0,
wherein the first SIB includes information regarding a first initial UL BWP and information regarding a second initial UL BWP for the RedCap UE, and
wherein the UE performs a random access procedure in the second initial UL BWP based on a second random access channel (RACH) configuration provided for the second initial UL BWP for the RedCap UE other than a first RACH configuration for the first initial UL BWP.

6. The UE of claim 5, wherein the second initial DL BWP does not exceed a maximum bandwidth of the RedCap UE.

7. The UE of claim 5, wherein the MIB is common for a non-RedCap UE and the RedCap UE.

8. The UE of claim 5, wherein the first SIB includes SIB1.

9. A base station (BS) in a wireless communication system, the BS comprising:
a transceiver;
a memory configured to store instructions; and
a processor configured to perform operations by executing the instructions, the operations comprising:
transmitting a master system information block (MIB); and
transmitting a first system information block (SIB) based on the MIB,
wherein the first SIB includes information regarding a first initial downlink bandwidth part (DL BWP) and information regarding a second initial DL BWP, the second initial DL BWP being present for a reduced capability (RedCap) user equipment (UE),
wherein the second initial DL BWP is used by the RedCap UE instead of the first initial DL BWP,
wherein, based on the second initial DL BWP being an active DL BWP of the RedCap UE, the BS assumes that the second initial DL BWP includes a synchronization signal (SS)/physical broadcast channel (PBCH) block that is related to the BS's transmission of a control resource set (CORESET) with an index 0,
wherein the first SIB includes information regarding a first initial UL BWP and information regarding a second initial UL BWP for the RedCap UE, and
wherein the BS performs a random access procedure with the RedCap UE in the second initial UL BWP based on a second random access channel (RACH) configuration provided for the second initial UL BWP for the RedCap UE other than a first RACH configuration for the first initial UL BWP.

10. The BS of claim 9, wherein the second initial DL BWP does not exceed a maximum bandwidth of the RedCap UE.

11. The BS of claim 9, wherein the MIB is common for a non-RedCap UE and the RedCap UE.

12. The BS of claim 9, wherein the first SIB includes SIB1.

* * * * *